US012712274B2

(12) United States Patent
Yun et al.

(10) Patent No.: US 12,712,274 B2
(45) Date of Patent: Aug. 18, 2026

(54) ANTENNA MODULE AND ELECTRONIC DEVICE COMPRISING SAME

(71) Applicant: Samsung Electronics Co., Ltd., Suwon-si (KR)

(72) Inventors: Yongsang Yun, Suwon-si (KR); Seongjin Park, Suwon-si (KR); Gunbae Lim, Suwon-si (KR); Jaebong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 172 days.

(21) Appl. No.: 18/649,244

(22) Filed: Apr. 29, 2024

(65) Prior Publication Data

US 2024/0283157 A1 Aug. 22, 2024

Related U.S. Application Data

(63) Continuation of application No. PCT/KR2022/016283, filed on Oct. 24, 2022.

(30) Foreign Application Priority Data

Nov. 1, 2021 (KR) ........................ 10-2021-0148157

(51) Int. Cl.
*H01Q 1/42* (2006.01)
*H01Q 9/04* (2006.01)
*H01Q 21/06* (2006.01)

(52) U.S. Cl.
CPC ............... *H01Q 9/045* (2013.01); *H01Q 1/42* (2013.01); *H01Q 21/065* (2013.01)

(58) Field of Classification Search
CPC ......... H01Q 9/045; H01Q 1/42; H01Q 21/065
See application file for complete search history.

(56) References Cited

U.S. PATENT DOCUMENTS 10,389,007 B1 8/2019 Choi
2010/0240327 A1 9/2010 Lambrecht
(Continued)

FOREIGN PATENT DOCUMENTS

CN 204350078 U 5/2015
KR 101970438 B1 4/2019
(Continued)

OTHER PUBLICATIONS

Extended European Search Report dated Feb. 3, 2025 issued in European Patent Application No. 22887532.4.
(Continued)

*Primary Examiner* — Graham P Smith
(74) *Attorney, Agent, or Firm* — Nixon & Vanderhye P.C.

(57) ABSTRACT

According to various embodiments of the present disclosure, an electronic device may comprise: a housing; a main circuit board disposed in the housing; an antenna module, comprising an antenna, disposed in the housing and including a first surface facing the outside of the electronic device and having a plurality of conductive patterns arranged on the first surface and a second surface facing a different direction from the first surface; a flexible printed circuit board at least a part of which is disposed at the second surface and which electrically connects the main circuit board and the antenna module to each other; and a cable connected to a seating surface formed by the flexible printed circuit board and is electrically connected to the antenna module.

20 Claims, 19 Drawing Sheets

(56) References Cited

U.S. PATENT DOCUMENTS

| | | | |
|---|---|---|---|
| 2019/0041907 | A1 | 2/2019 | Kim |
| 2019/0082529 | A1 | 3/2019 | Sloey |
| 2019/0165454 | A1 | 5/2019 | Lee |
| 2019/0386380 | A1 | 12/2019 | Ham et al. |
| 2020/0036824 | A1 | 1/2020 | Lee |
| 2020/0194879 | A1 | 6/2020 | Lim |
| 2020/0411989 | A1 | 12/2020 | Oh |
| 2021/0036434 | A1 | 2/2021 | Yeom |
| 2021/0280971 | A1 | 9/2021 | Kim |
| 2022/0069437 | A1 | 3/2022 | Yoo |
| 2023/0155610 | A1 | 5/2023 | Lee |

FOREIGN PATENT DOCUMENTS

| | | | |
|---|---|---|---|
| KR | 20190061161 | A | 6/2019 |
| KR | 20190089692 | A | 7/2019 |
| KR | 10-2019-0141474 | | 12/2019 |
| KR | 20190140209 | A | 12/2019 |
| KR | 20200008647 | A | 1/2020 |
| KR | 20200073745 | A | 6/2020 |
| KR | 20200110061 | A | 9/2020 |
| KR | 20210015563 | A | 2/2021 |
| KR | 20210017066 | A | 2/2021 |

OTHER PUBLICATIONS

Korean Office Action issued Nov. 19, 2025 in corresponding Korean Patent Application No. 10-2021-0148157.
International Search Report for PCT/KR2022/016283 mailed Feb. 3, 2023, 5 pages.
Written Opinion of the ISA for PCT/KR2022/016283 mailed Feb. 3, 2023, 4 pages.

ANTENNA MODULE AND ELECTRONIC DEVICE COMPRISING SAME

CROSS-REFERENCE TO RELATED APPLICATIONS

This application is a continuation of International Application No. PCT/KR2022/016283 designating the United States, filed on Oct. 24, 2022, in the Korean Intellectual Property Receiving Office and claiming priority to Korean Patent Application No. 10-2021-0148157, filed on Nov. 1, 2021, in the Korean Intellectual Property Office, the disclosures of each of which are incorporated by reference herein in their entireties.

BACKGROUND

Field

The disclosure relates to an antenna module and an electronic device including the same.

Description of Related Art

Electronic devices may output stored information as voice or images. As electronic devices are highly integrated, and high-speed or high-volume wireless communication becomes commonplace, an electronic device, such as a mobile communication terminal, is recently being equipped with various functions. For example, an electronic device comes with the integrated functionality, including an entertainment function, such as playing video games, a multimedia function, such as replaying music/videos, a communication and security function for mobile banking, and a scheduling or e-wallet function.

In order to meet demand for soaring wireless data traffic since the 4G communication system came on the market, there are ongoing efforts to develop next-generation communication systems, e.g., 5G communication systems or pre-5G communication systems.

For higher data rates, next-generation communication systems adopt ultra-high frequency bands of a few tens of GHz, e.g., 6 GHz or more and 300 GHz or less, such as those of mmWave. To mitigate pathloss on the ultra-high frequency band and increase the reach of radio waves, the following techniques are taken into account for the next-generation communication system: beamforming, massive multi-input multi-output (MIMO), full dimensional MIMO (FD-MIMO), array antenna, analog beamforming, and large scale antenna.

An electronic device may include a communication processor for transmitting and/or receiving signals of various bands (e.g., signals of ultra-high frequency bands) related to an antenna, a printed circuit board where the communication processor is mounted, an antenna module exchanging communication signals with the communication, and/or a plurality of transmission lines and/or boards (e.g., printed circuit board or flexible printed circuit board) for connecting the printed circuit board with the antenna module.

In general, signals of various bands (e.g., signals of ultra-high frequency bands) related to an antenna pass through multiple transmission lines and/or multiple boards and thus undergo signal attenuation, deteriorating communication quality.

SUMMARY

Embodiments of the disclosure may provide an antenna module capable of reducing signal attenuation during a transmission and/or reception process inside an electronic device and an electronic device including the same.

Embodiments of the disclosure may provide an antenna module electrically connecting a printed circuit board with an antenna module through a simplified structure and an electronic device including the same.

An electronic device according to various example embodiments of the disclosure may comprise: a housing, a main circuit board disposed in the housing, an antenna module, comprising an antenna, disposed in the housing and including a first surface facing outward of the electronic device and having a plurality of conductive patterns disposed thereon and a second surface facing in a direction different from the first surface, a flexible printed circuit board having at least a portion disposed on the second surface and electrically connecting the main circuit board and the antenna module, and a cable connected to a seating surface formed by the flexible printed circuit board to be electrically connected to the antenna module.

An electronic device according to various example embodiments of the disclosure may comprise: a housing, a main circuit board disposed in the housing, an antenna module, comprising an antenna, disposed in the housing and including a first surface facing outward of the electronic device and having a plurality of conductive patterns disposed thereon and a second surface facing in a direction different from the first surface, a supporting member, comprising a support, supporting the antenna module, a flexible printed circuit board having at least a portion disposed on the supporting member and electrically connecting the main circuit board and the antenna module, and a cable connected to a seating surface formed by the flexible printed circuit board to be electrically connected to the antenna module.

An electronic device according to various example embodiments of the disclosure may comprise: a housing, a main circuit board disposed in the housing, an antenna module, comprising an antenna, disposed in the housing and including a first surface including a plurality of conductive patterns and a second surface having a first area for electrically connecting to the main circuit board, a supporting member, comprising a support, fixing the antenna module to the housing, a flexible printed circuit board having at least a portion disposed on the supporting member or the second surface and electrically connecting the main circuit board and the antenna module, and a cable connected to a surface opposite to a surface where the flexible printed circuit board is disposed on the supporting member or the second surface to be electrically connected to the antenna module.

An electronic device according to various example embodiments of the disclosure may enhance communication quality by reducing or limiting signal attenuation during a signal transmission and/or reception process.

An electronic device according to various example embodiments of the disclosure may increase the utilization of an inner space of the electronic device by forming a cable connection structure on one surface of an antenna module.

Effects of the disclosure are not limited to the foregoing, and other unmentioned effects will be apparent to one of ordinary skill in the art from the following description.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
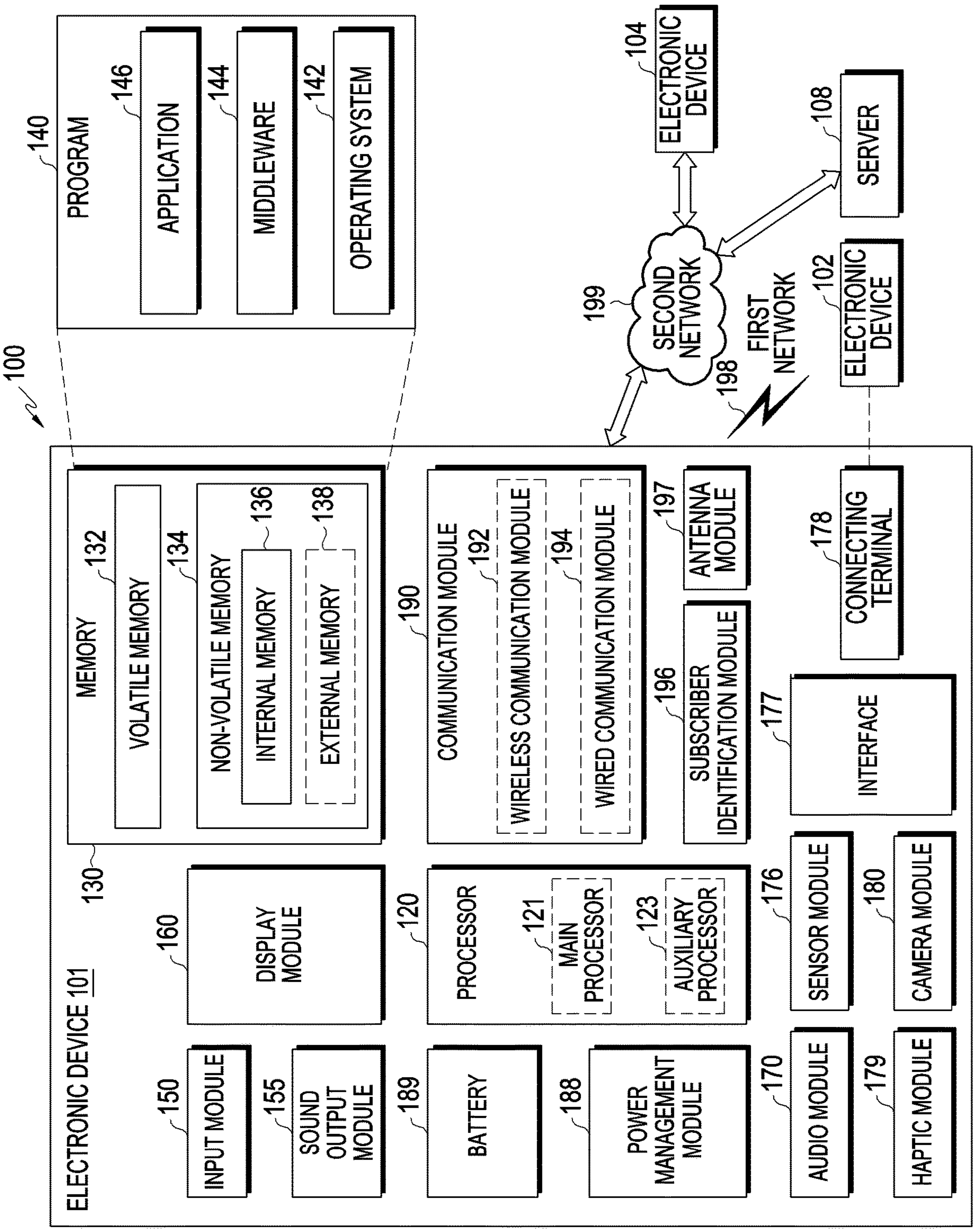
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal According to an embodiment, the display module 160 may include a first display module 351 corresponding to the user's left eye and/or a second display module 353 corresponding to the user's right eye, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
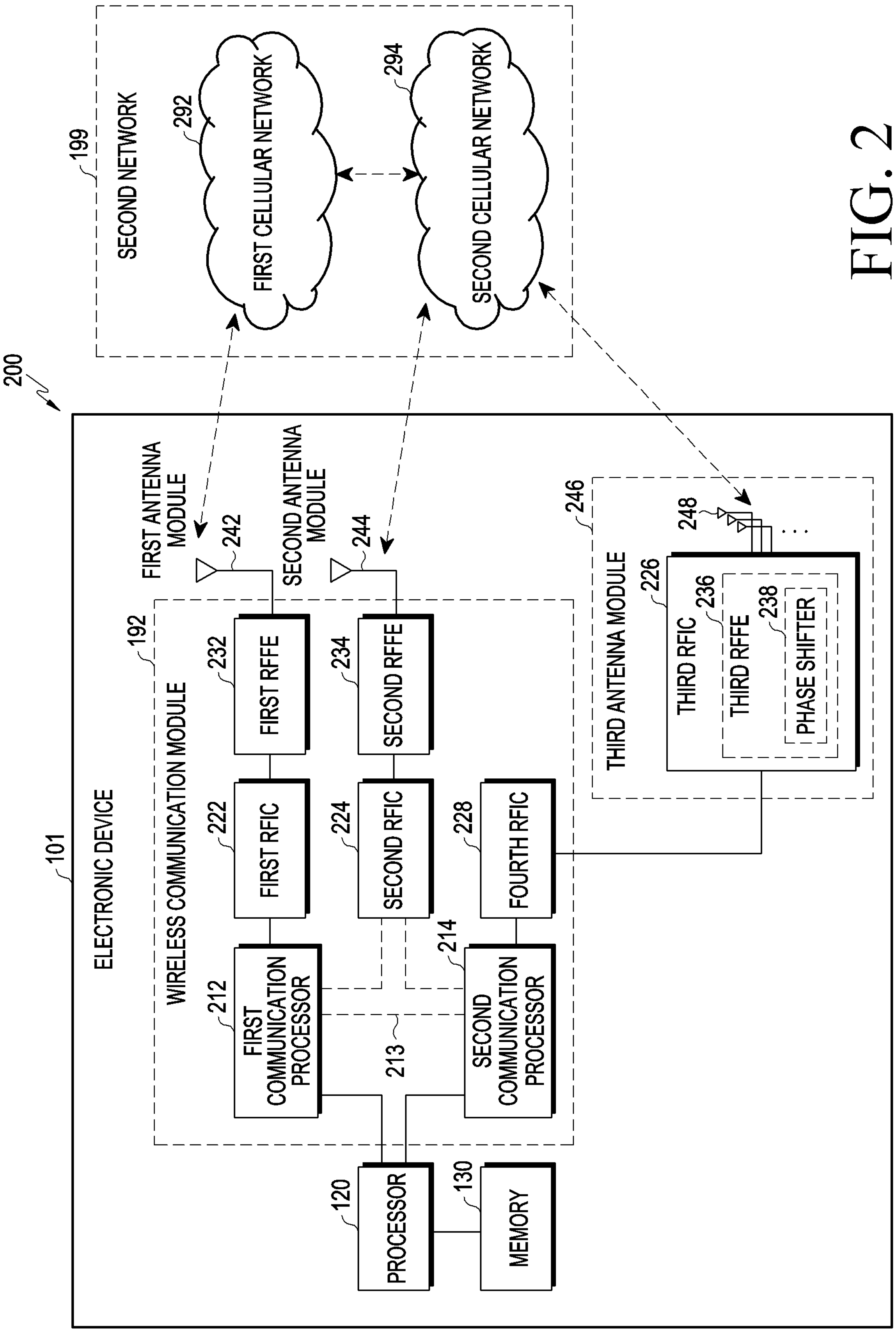
FIG. 2 is a block diagram illustrating an example configuration of an electronic device in a network environment including a plurality of cellular networks according to various embodiments.

FIG. 2 is a block diagram 200 illustrating an example configuration of an electronic device 100 in a network environment including a plurality of cellular networks according to various embodiments.

The configuration of the processor 120 and the memory 130 of FIG. 2 may be identical in whole or part to the configuration of the processor 120 and the memory 130 of FIG. 1.

Referring to FIG. 2, the electronic device 101 may further include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFEE) 232, a second RFEE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to an embodiment, the second network 199 may further include at least one other network. According to an embodiment, the first communication processor 212, the second communication processor 214, the first RFIC 222, the second RFIC 224, the fourth RFIC 228, the first RFEE 232, and the second RFEE 234 may form at least part of the wireless communication module 192. According to an embodiment, the fourth RFIC 228 may be omitted or be included as part of the fourth RFIC 226.

According to an embodiment, the first CP 212 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The first CP 212 may, for example, establish a communication channel of a band that is to be used for wireless communication with the first cellular network 292 or may support legacy network communication via the established communication channel. According to various embodiments, the first cellular network 292 may be a legacy network that includes second generation (2G), third generation (3G), fourth generation (4G), or long-term evolution (LTE) networks. The second communication processor 214 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The second communication processor 214 may, for example, establish a communication channel corresponding to a designated band (e.g., from about 6 GHz to about 60 GHz) among bands that are to be used for wireless communication with the second cellular network 294 or may support fifth generation (5G) network communication via the established communication channel. According to an embodiment, the second cellular network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel. According to an embodiment, the first CP 212 and the second CP 214 may be implemented in a single chip or a single package. According to various embodiments, the first communication processor 212 or the second communication processor 214, along with the processor 120, an assistance processor 123, or communication module 190, may be formed in a single chip or single package.

According to an embodiment, upon transmission, the first RFIC 222 may convert a baseband signal generated by the first CP 212 into a radio frequency (RF) signal with a frequency ranging from about 700 MHz to about 3 GHz which is used by the first cellular network 292 (e.g., a legacy network). Upon receipt, the RF signal may be obtained from the first cellular network 292 (e.g., a legacy network) through an antenna (e.g., the first antenna module 242) and be pre-processed via an RFEE (e.g., the first RFEE 232). The first RFIC 222 may convert the pre-processed RF signal into a baseband signal that may be processed by the first CP 212.

According to an embodiment, upon transmission, the second RFIC 224 may convert the signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFEE (e.g., the second RFEE 234). The second RFIC 224 may convert the pre-processed 5G Sub6 RF signal into a baseband signal that may be processed by a corresponding processor of the first communication processor 212 and the second communication processor 214.

According to an embodiment, the third RFIC 226 may convert the baseband signal generated by the second communication processor 214 into a 5G Above6 band (e.g., from about 6 GHz to about 60 GHz) RF signal (hereinafter, "5G Sub6 RF signal") that is to be used by the second cellular network 294 (e.g., a 5G network). Upon receipt, the 5G Sub6 RF signal may be obtained from the second cellular network 294 (e.g., a 5G network) through an antenna (e.g., the antenna 248) and be pre-processed via the RFEE (e.g., the third RFEE 236). The third RFIC 226 may convert the pre-processed 5G Above6 RF signal into a baseband signal that may be processed by the second communication processor 214. According to an embodiment, the third RFEE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 448) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, the first RFEE 232 and the second RFEE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 448, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second cellular network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFEE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

According to an embodiment, the second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may have the access network (e.g., 5G radio access network (RAN) or next generation RAN (NG RAN)) but may not have the core network (e.g., next generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first CP 212, or the second CP 214).

Figure 3A:
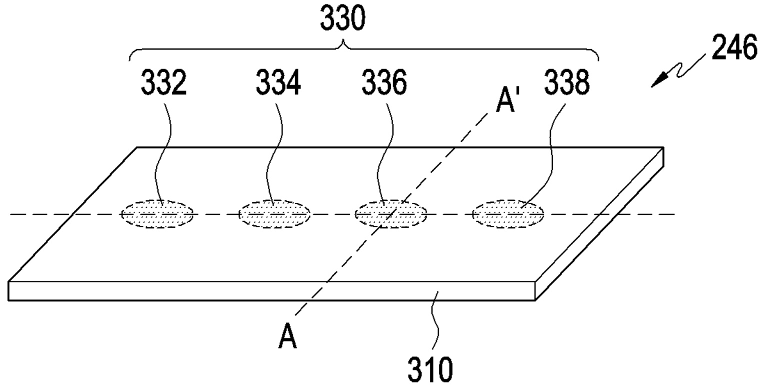
FIGS. 3A, 3B and 3C are diagrams illustrating an example structure of a third antenna module, according to various embodiments.
Figure 3B:
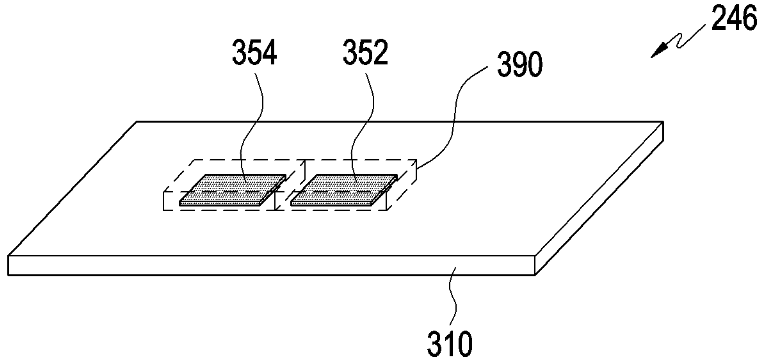
Figure 3C:
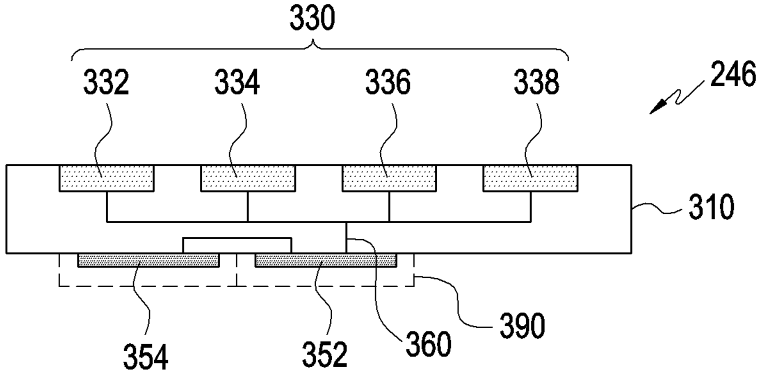

FIGS. 3A, 3B and 3C are diagrams illustrating an example structure of a third antenna module described in connection with FIG. 2, according to various embodiments. FIG. 3A is a perspective view illustrating the third antenna module as viewed from one side according to various embodiments, FIG. 3B is a perspective view illustrating the third antenna module as viewed from another side according to various embodiments, and FIG. 3C is a cross-sectional view illustrating the antenna module taken along A-A' according to various embodiments.

Referring to FIGS. 3A, 3B and 3C, in an embodiment, the third antenna module 246 may include a printed circuit board 310, an antenna array 330, a radio frequency integrated circuit (RFIC) 352, and a power management integrated circuit (PMIC) 354. Selectively, the third antenna module 246 may further include a shielding member (e.g., shield) 390. According to various embodiments, at least one of the above-mentioned components may be omitted, or at least two of the components may be integrally formed with each other.

According to an embodiment, the printed circuit board 310 may include a plurality of conductive layers and a plurality of non-conductive layers alternately stacked with the conductive layers. Electronic components arranged on, or outside of, the printed circuit board 310 may be electrically connected together via wires and conductive vias formed on or through the conductive layers.

According to an embodiment, the antenna array 330 (e.g., the antenna 248 of FIG. 2) may include a plurality of antenna antennas 332, 334, 336, or 338 arranged to form directional beams. The antenna elements may be formed on a first surface of the printed circuit board 310 as shown. According to an embodiment, the antenna array 330 may be formed inside the printed circuit board 310. According to embodiments, the antenna array 330 may include a plurality of antenna arrays (e.g., a dipole antenna array and/or a patch antenna array) of the same or different shapes or kinds.

According to an embodiment, the RFIC 352 (e.g., the third RFIC 226 of FIG. 2) may be disposed in another area (e.g., a second surface opposite to the first surface) of the printed circuit board 310 which is spaced apart from the antenna array. The RFIC is configured to be able to process signals of a selected frequency band which are transmitted or received via the antenna array 330. According to an embodiment, upon transmission, the RFIC 352 may convert a baseband signal obtained from a CP (not illustrated) into a designated band of RF signal. Upon receipt, the RFIC 352 may convert the RF signal received via the antenna array 330 into a baseband signal and transfer the baseband signal to the communication processor.

According to an embodiment, upon transmission, the RFIC 352 may up-convert an IF signal (e.g., ranging from about 9 GHz to about 11 GHz) obtained from the intermediate frequency integrated circuit (IFIC) (e.g., 228 of FIG. 2) into a selected band of RF signal. Upon receipt, the RFIC 352 may down-convert the RF signal obtained via the antenna array 330 into an IF signal and transfer the IF signal to the IFIC.

According to an embodiment, the PMIC 354 may be disposed in another portion (e.g., the second surface) of the PCB 310 which is spaced apart from the antenna array. The PMIC may receive a voltage from a main PCB (not illustrated) and provide necessary power to various components (e.g., the RFIC 352) on the antenna module.

According to an embodiment, the shielding member 390 may be disposed in a portion (e.g., the second surface) of the PCB 310 to electromagnetically shield off at least one of the RFIC 352 or the PMIC 354. According to an embodiment, the shielding member 390 may include a shield can.

Although not shown, according to various embodiments, the third antenna module 246 may be electrically connected with another printed circuit board (e.g., the main printed circuit board) via the module interface. The module interface may include a connecting member, e.g., a coaxial cable connector, board-to-board connector, interposer, or flexible printed circuit board (FPCB). The RFIC 352 and/or the PMIC 354 may be electrically connected with the printed circuit board via the connecting member.

Although not shown, in various embodiments, the third antenna module 246 may include a printed circuit board 310, a module antenna coupled and/or connected to one surface of the printed circuit board 310 and having an antenna array 330 formed therein, an RFIC 352 and/or a PMIC 354 coupled and/or connected to the other surface of the printed circuit board 310. For example, the module antenna may be electrically connected to the RFIC 352 through the printed circuit board 310.

Figure 4:
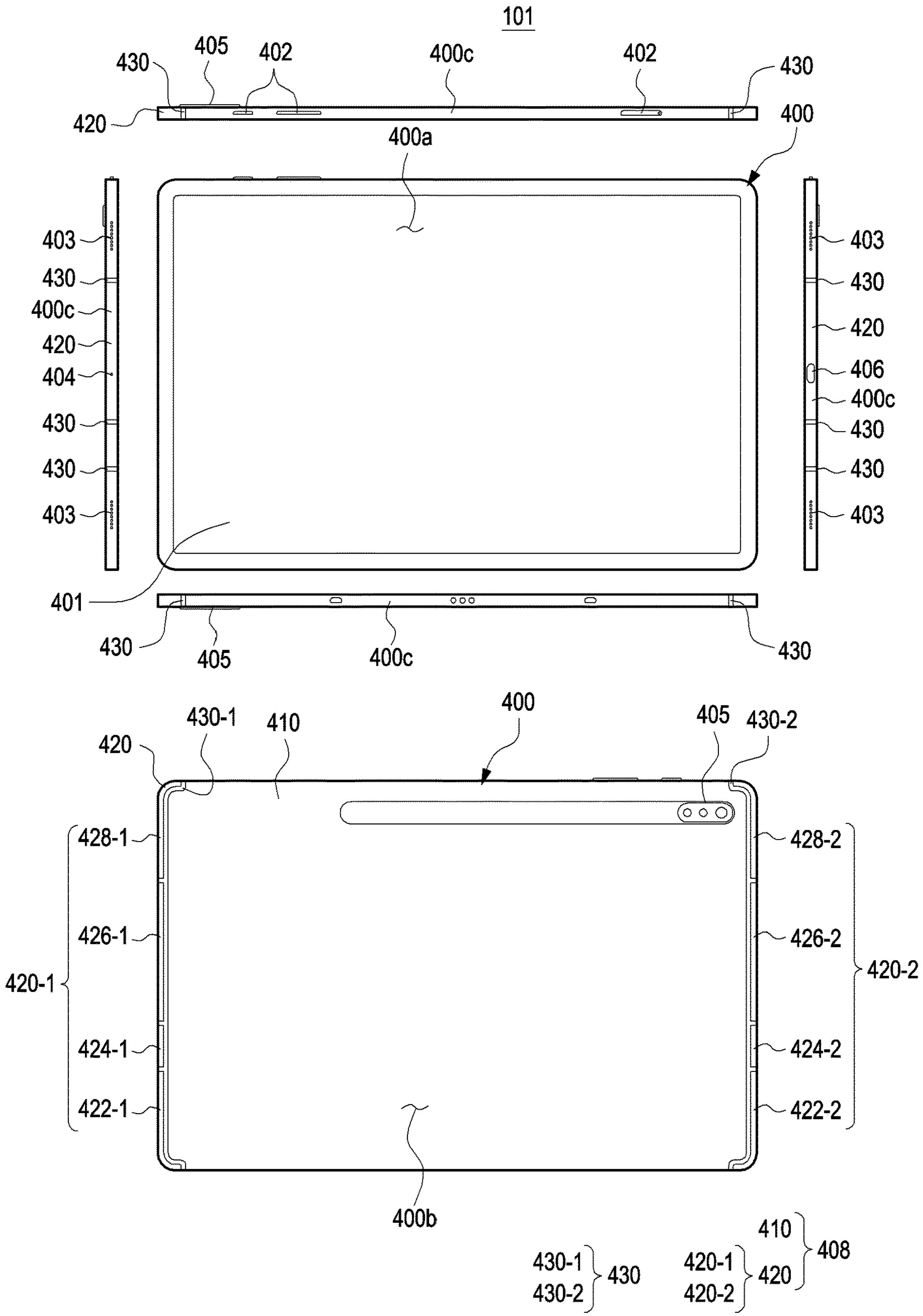
FIG. 4 is a diagram illustrating a plan view of an electronic device according to various embodiments.

FIG. 4 is a diagram illustrating a plan view of an electronic device according to various embodiments.

Referring to FIG. 4, the electronic device 101 may be, e.g., a tablet PC. As another example (not illustrated), the electronic device 101 may be a laptop computer or a smartphone. It will be understood that there is no limitation in the type of electronic device. The electronic device 101 may include a housing 400 including a metal area 408 and a resin area 430.

According to various embodiments, the housing 400 may include a front surface 400*a*, a rear surface 400*b*, and a side surface 400*c* surrounding a space between the front surface 400*a* and the rear surface 400*b*. According to an embodiment, the front surface 400*a* may be a front plate in which at least one portion is substantially transparent. For example, the front 400*a* of the housing 400 may include a glass plate or polymer plate including various coating layers. According to an embodiment, the rear surface 400*b* and/or the side surface 400*c* may be formed of metal. According to an embodiment, the front surface 400*a*, rear surface 400*b*, and/or side surface 400*c* of the housing 400 may also be interpreted as the front surface 400*a*, rear surface 400*b*, and/or side surface 400*c* of the electronic device 101.

According to various embodiments, the metal area 408 may include a first metal area 410 and a second metal area 420. According to an embodiment, the metal area 408 may include at least one of aluminum, stainless steel, or magnesium. According to an embodiment, the second metal area 420 may be spaced apart from the first metal area 410.

According to various embodiments, the first metal area 410 may support a component (e.g., a battery (the battery 189 of FIG. 1) or a display module (e.g., the display module 160 of FIG. 1)) of the electronic device 101. According to an embodiment, the first metal area 410 may form at least a portion of the edge of the electronic device 101. For example, the first metal area 410 may form at least a portion of the rear surface 400*b* and/or the side surface 400*c*.

According to various embodiments, the second metal area 420 may function as an antenna. For example, the second metal area 420 may be electrically connected to an antenna module (e.g., the antenna module 197 of FIG. 1) to transmit and/or receive electromagnetic waves.

According to various embodiments, the second metal area 420 may form at least a portion of the edge of the electronic device 101. For example, the second metal area 420 may form at least a portion of the side surface 400*c* of the housing 400.

According to various embodiments, a plurality of second metal areas 420 may be formed. According to an embodiment, the second metal areas 420 may be positioned in front of and behind the housing 400. For example, the second metal area 420 may include a front second metal area 420-1 positioned in front of the housing 400 and a rear second metal area 420-2 spaced apart from the front second metal area 420-1.

According to various embodiments, the second metal area 420 may include a plurality of second metal areas segmented by the resin area 230. For example, the front second metal area 420-1 and the rear second metal area 420-2 of the second metal area 420 may be separated into a plurality of antennas to perform an antenna function. According to an embodiment, the front second metal area 420-1 may include at least one of a 2-1th metal area 422-1, a 2-2th metal area 424-1, a 2-3th metal area 426-1, or a 2-4th metal area 428-1, and the rear second metal area 420-2 may include at least one of a 2-5th metal area 422-2, a 2-6th metal area 424-2, a 2-7th metal area 426-2, or a 2-8th metal area 428-2.

According to various embodiments, the resin area 430 may connect the first metal area 410 and the second metal area 420. According to an embodiment, at least a portion of the resin area 430 may be disposed between the first metal area 410 and the second metal area 420. According to an embodiment, the resin area 430 may form at least a portion of the rear surface 400*b* and/or the side surface 400*c* of the housing 400.

According to various embodiments, a plurality of second metal areas may be electrically separated by the resin area 430. For example, the resin area 430 may be formed of an insulating material. According to an embodiment, the electrical conductivity of the resin area 430 may be lower than that of the metal area 408. According to an embodiment, the front second metal areas 422-1, 424-1, 426-1, and 428-1 or the rear second metal areas 422-2, 424-2, 426-2, and 428-2 each may be disposed on the resin area 430.

According to various embodiments, a plurality of resin areas 430 may be formed. According to an embodiment, the resin area 430 may be positioned in front of and behind the housing 400. For example, the resin area 430 may include a front resin area 430-1 disposed between the front second metal area 420-1 and the first metal area 410 and a rear resin area 430-2 disposed between the rear second metal area 420-2 and the first metal area 410.

According to various embodiments, the electronic device 101 may include a display 401, a key input structure 402, audio modules 403 and 404, a light emitting device (not illustrated), a camera module 405, a connector hole 406, and/or a sensor module (not illustrated). In an embodiment, the electronic device 101 may omit at least one (e.g., the connector hole 406) of the components or may further include other components.

According to various embodiments, the display 401 (e.g., the display module 160 of FIG. 1) may be coupled with or disposed adjacent to a touch detection circuit, a pressure sensor capable of measuring the strength (pressure) of touches, and/or a digitizer for detecting a magnetic field-type stylus pen. According to an embodiment, the display 401 may be visible through the front surface 400*a* of the housing 400.

According to an embodiment, the key input structure 402 (e.g., the input module 150 or the sensor module 176 of FIG. 1) may be disposed on the side surface 400*c* of the housing 400. In an embodiment, the electronic device 101 may not include at least a portion of the above-mentioned key input structure 402, and the key input structure 402 that is not included may be implemented in the form of a soft key on the display 401.

According to various embodiments, the light emitting device (not illustrated) may be disposed, e.g., on the front surface 400*a* and/or the rear surface 400*b* of the housing 400. The light emitting device (not illustrated) may provide, e.g., information about the state of the electronic device 101 in the form of light. The light emitting device (not illustrated) may provide, e.g., state information about the electronic device 101 in the form of light. The light emitting device (not illustrated) may include, e.g., a light emitting diode (LED), an infrared (IR) LED, and/or a xenon lamp.

In an embodiment, the light emitting device (not illustrated) may provide, e.g., a light source that interoperates with the operation of the front camera module (not illustrated) or the rear camera module 405. The flash may include, e.g., a light emitting diode (LED) or a xenon lamp. In an embodiment, two or more lenses (an infrared (IR) camera, a wide-angle lens, and a telephoto lens) and image sensors may be disposed on one surface of the electronic device 101. According to an embodiment, the electronic device 101 may include a front camera module (not illustrated) disposed on the front surface 400*a* of the electronic device 101 and a rear camera module 405 disposed on the rear surface 400*b* of the electronic device 101.

According to various embodiments, the connector hole 406 (e.g., the connecting terminal 178 of FIG. 1) may receive, e.g., a connector (e.g., a USB connector) for transmitting and receiving power and/or data to and from an external electronic device, or a connector (e.g., an earphone jack) for transmitting and receiving an audio signal to and from an external electronic device.

According to various embodiments, a sensor module (not illustrated) (e.g., the sensor module 176 of FIG. 1) may generate an electrical signal or data value corresponding to, e.g., an internal operating state of the electronic device 101 or an external environmental state. The sensor modules (not illustrated) may include a first sensor module (not illustrated) (e.g., a proximity sensor) and/or a second sensor module (not illustrated) (e.g., a fingerprint sensor) disposed on the front surface 400*a* of the housing 400 and/or a third sensor module (not illustrated) (e.g., an HRM sensor) and/or a fourth sensor module (not illustrated) (e.g., a fingerprint sensor) disposed on the rear surface 400*b* of the housing 400. In an embodiment (not illustrated), the fingerprint sensor may be disposed on the rear surface 400*b* as well as on the front surface 400*a* (e.g., the display 401) of the housing 400. The electronic device 101 may further include sensor modules not shown, e.g., at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illuminance sensor (not illustrated).

Figure 5:
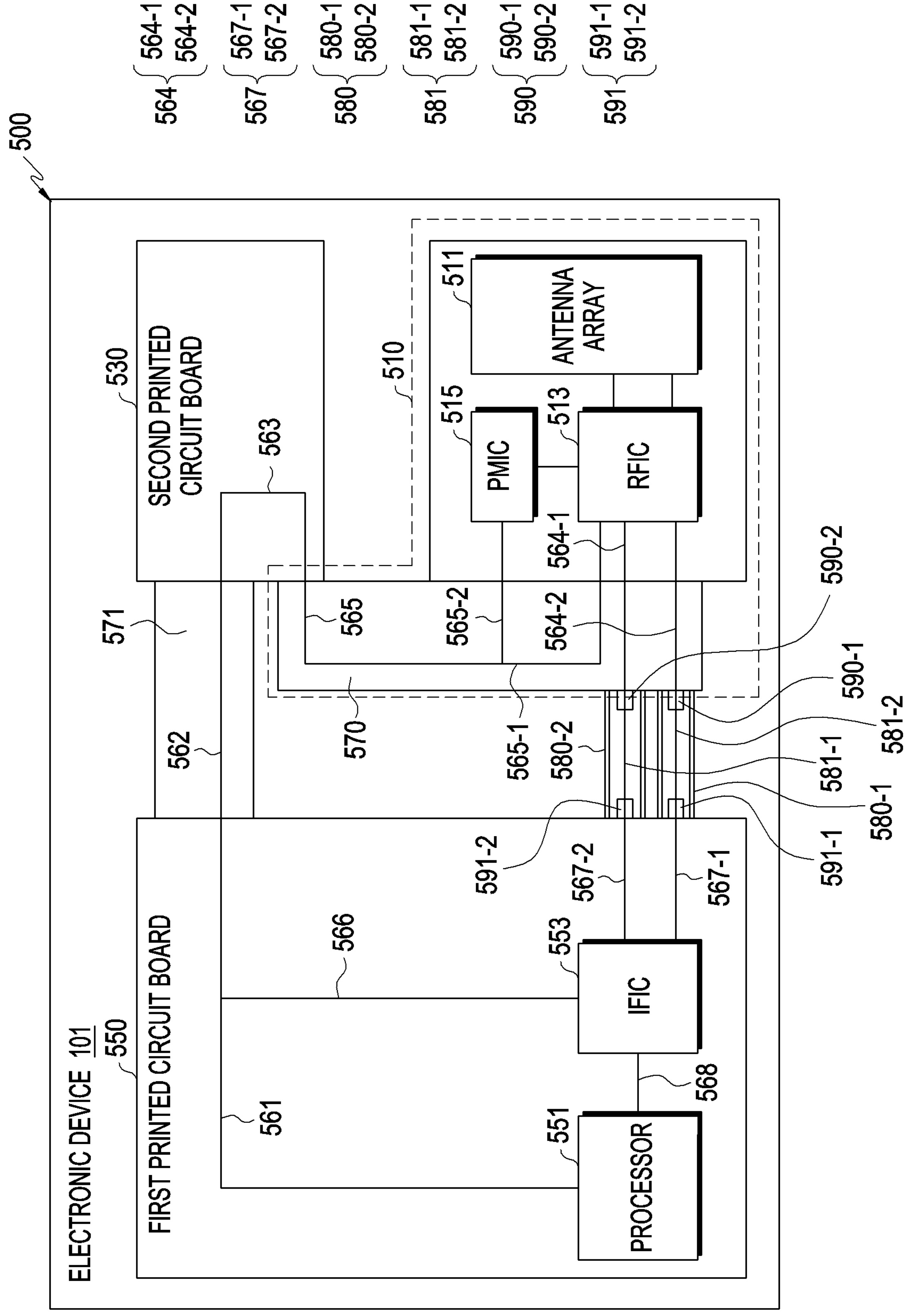
FIG. 5 is a block diagram illustrating an example configuration of an electronic device for supporting high-frequency communication according to various embodiments.

FIG. 5 is a block diagram illustrating an example configuration of an electronic device for supporting high-frequency communication according to various embodiments. In the disclosure, high frequency communication may refer, for example, to communication in an mmWave band, and may refer to, e.g., communication in a frequency band (e.g., 28 GHz or 39 GHz) of frequency range 2 (e.g., 24.25 GHz to 52.6 GHz) defined in 3GPP.

Referring to FIG. 5, an electronic device 101 (e.g., the electronic device 101 of FIG. 1, FIG. 2, and/or FIG. 4) may include a housing 500, an antenna module (e.g., including an antenna) 510, a processor (e.g., including processing circuitry) 551, a first printed circuit board 550, a second flexible printed circuit board 571, a second printed circuit board 530, a fourth transmission line 564, a fifth transmission line 565, a third connector 590, and/or a coaxial cable 580.

According to an embodiment, the electronic device 101 (e.g., the electronic device 101 of FIG. 1, 2, or 4) may include a housing 500 (e.g., the housing 400 of FIG. 4).

According to an embodiment, the antenna module 510 (e.g., the antenna module 197 of FIG. 1 or the third antenna module 246 of FIG. 2) may transmit or receive a signal to or from the outside (e.g., the external electronic device). For example, the antenna module 510 may be disposed adjacent to the housing 500 (e.g., the housing 400 of FIG. 4) to transmit and/or receive a signal to and/or from an external electronic device. The antenna module 510 may be, e.g., an mmWave antenna module. In an embodiment, the antenna module 510 may include, e.g., an antenna array 511, an RFIC 513 (e.g., the RFIC 352 of FIG. 3), a PMIC 515 (e.g., the PMIC 354 of FIG. 3), and a first flexible printed circuit board 570. In an embodiment, the first flexible printed circuit board 570 may be a separate component from the antenna module 510.

According to an embodiment, the antenna array 511 (e.g., the antenna array 330 of FIG. 3) may be disposed on one surface of a substrate forming the antenna module 510, and the RFIC 513 may be disposed on the other surface of the substrate.

According to an embodiment, the antenna module 510 may include an RFIC 513 and an antenna array 511 disposed on the same substrate. The antenna module 510 may reduce the transmission path of the signal transmitted to the antenna module 510 and the signal received from the antenna module 510, thereby reducing the loss of the signal of the RF frequency (hereinafter, referred to as the RF signal) generated in the transmission line. The signal of the RF frequency is a signal of a band used in a terminal used for 5G network communication, and may use a signal of a high frequency band (e.g., about 6 GHz to about 60 GHz).

Signal loss may refer, for example, to loss caused by the transmission line, e.g., influence by the external signal reaching the transmission line, such as interference or distortion of the high-frequency signal in the transmission line and the connector on the data transmission line and/or signal attenuation occurring in the transmission line (e.g., conductor loss or dielectric loss).

According to an embodiment, the antenna radiators of the antenna array 511 may include a substrate (e.g., the printed circuit board 311 of FIG. 3) and conductive patterns formed on the substrate. The antenna array 511 may include antennas having the same shape or different shapes. For example, the conductive patterns printed on the substrate may form a patch antenna and/or a dipole antenna. The antenna array 511 may include the patch antennas and/or the dipole antennas that are repeatedly disposed. The antenna array 511 may form an antenna radiator for mmWave having straightness. The antenna array 511 may be used for beamforming. For example, the antenna array 511 may be a set of antenna radiators. The antenna array 511 may form a directional beam pattern by synthesizing beam patterns of antenna radiators. According to an embodiment, the electronic device 101 may be configured to minimize and/or reduce transmission signal loss in the electronic device 101 and transfer the transmission signal to the antenna array 511. For example, the electronic device 101 may include a member protruding from the housing 500 to replace a portion of the transmission line for transferring a transmission signal with a coaxial cable 580 (580-1 and 580-2), to dispose a connector adjacent to the antenna module 510, and to support the coaxial cable 580 (580-1 and 580-2) and to fix the connectors.

According to an embodiment, the RFIC 513 (e.g., the third RFIC 226 of FIG. 2) may be disposed on a surface distinct from the surface of the substrate on which the antenna array 511 is disposed. The RFIC 513 may include a mixer for up-converting or down-converting a signal. The RFIC 513 may up-convert an intermediate frequency signal (hereinafter, referred to as an IF signal) received from the IFIC 553 (e.g., the fourth RFIC 228 of FIG. 2) into an RF frequency signal. The signal of the RF frequency up-converted through the RFIC 513 may be transferred to the antenna array 511. When receiving the signal, the RFIC 513 may down-convert the signal of the RF frequency obtained through the antenna array 511 into an IF signal. The RFIC 513 may transfer the converted IF signal to the IFIC 553.

The intermediate frequency (IF) signal may be a signal having an intermediate frequency band (e.g., about 9 GHz to about 11 GHz) in which a baseband signal generated by a processor (e.g., the processor 120 of FIG. 1, the first communication processor 212 or the second communication processor 214 of FIG. 2) is converted through the IFIC 553.

According to an embodiment, the PMIC 515 (e.g., the power management module 188 of FIG. 1) may be disposed on a surface distinct from the surface of the substrate on which the antenna array 511 is disposed. For example, the PMIC 515 and the RFIC 513 may be disposed on a surface other than one surface of the substrate on which the antenna array 511 is disposed, and the PMIC 515 and the RFIC 513 may be disposed together on a surface distinct from the one surface of the substrate. The PMIC 515 may receive power from the first printed circuit board 550 or the second printed circuit board 530 distinguished from the first printed circuit board 550. The PMIC 515 may supply power to various components (e.g., the RFIC 513) on the antenna module 510 with the received power. According to an embodiment, the first printed circuit board 550 and the second printed circuit board 530 may be provided as separate printed circuit boards. According to an embodiment (not illustrated), the first printed circuit board 550 and the second printed circuit board 530 may be provided as one printed circuit board.

According to an embodiment, the first printed circuit board 550 may include a processor 551 (e.g., the first communication processor 212 or the second communication processor 214 of FIG. 2) for supporting 4G network and/or 5G network communication. The first printed circuit board 550 may be a substrate distinguished from the substrate of the antenna module 310. For network communication, the first printed circuit board 550 may transmit a signal for controlling the antenna module 510 and/or a baseband signal to be transferred to the antenna to the RFIC 513. According to an embodiment, the first printed circuit board 550 may receive power from a power supply device, and may transfer the received power to the antenna module 510.

According to an embodiment, the processor 551 may be a communication processor. The processor 551 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 551 may, for example, establish a communication channel of a band to be used for wireless communication with an external network. According to an embodiment, the processor 551 may generate a baseband signal. When transmitting a signal, the processor 551 may provide the baseband signal to the IFIC 553. According to an embodiment, upon receiving the signal, the processor 551 may receive the down-converted baseband signal from the IFIC 553 or the RFIC 513.

According to an embodiment, the IFIC 553 may include a mixer for up-converting or down-converting a signal. For example, when transmitting a signal, the IFIC 553 may up-convert the baseband signal provided from the processor 551 into an intermediate frequency signal. The IFIC 553 may transmit the up-converted intermediate frequency signal to the RFIC 513. As another example, when receiving a signal, the IFIC 553 may down-convert the intermediate frequency signal received from the RFIC 513 into a baseband signal that may be processed by the processor 551. The IFIC 553 may transfer the down-converted baseband signal to the processor 551.

According to various embodiments, the electronic device 101 may include transmission lines for transmitting signals. The transmission lines may transfer a transmission signal, a control signal, and/or power.

According to an embodiment, the processor 551 may transfer a control signal to the antenna module 510 through a first transmission line 561, a second transmission line 562, a third transmission line 563, a fifth transmission line 565, and/or a sixth transmission line 566. The processor 551 may transfer a control signal to the IFIC 553 through the first transmission line 561 and/or the sixth transmission line 566. The processor 551 may transmit or receive a transmission signal to or from the antenna module 310 through the fourth transmission line 564 (564-1 and 564-2), the seventh transmission line 567 (567-1 and 567-2) of the coaxial cable 580 (580-1 and 580-2), and/or the eighth transmission line 568. According to an embodiment, the IFIC 553 may transfer a control signal to the antenna module 510 using a transmission line. For example, the IFIC 553 may transfer a control signal to the antenna module 510 using the sixth transmission line 566, the first transmission line 561, the second transmission line 562, the third transmission line 563, and/or the fifth transmission line 565 (565-1 and 565-2).

According to an embodiment, the first printed circuit board 550 may include a transmission line capable of transmitting a transmission signal (e.g., a baseband signal) provided by the processor 551 or a control signal of the PMIC 515 and/or the RFIC 513. For example, the first printed circuit board 550 may include a first transmission line 561, a sixth transmission line 566, a seventh transmission line 567 (567-1 and 567-2), and/or an eighth transmission line 568.

According to an embodiment, the first transmission line 561 may extend from the processor 551. The first transmission line 561 may be a line printed on a surface of one layer of the first printed circuit board 550. The first transmission line 561 may be electrically connected to a connector (not illustrated) formed on the first printed circuit board 550 for connection with the second flexible printed circuit board 571. The first transmission line 561 may electrically connect the processor 551 and the second flexible printed circuit board 571. The path formed by the first transmission line 561, the second flexible printed circuit board 571, the second printed circuit board 530, and/or the first flexible printed circuit board 570 may transfer a control signal generated by the processor 551 to the antenna module 510.

According to an embodiment, the sixth transmission line 566 may extend from the IFIC 553. The sixth transmission line 566 may be electrically connected to the first transmission line 561. The first transmission line 561 and/or the sixth transmission line 566 may electrically connect the processor 551 and the IFIC 553. According to an embodiment, the sixth transmission line 566 may be directly connected to the processor 551 without being merged with the first transmission line 561. The sixth transmission line 566 may electrically connect the processor 551 and the IFIC 553. The sixth transmission line 566 may transmit a control signal from the processor 551 to the IFIC 553. The sixth transmission line 566 may be printed on one layer of the first printed circuit board 550.

According to an embodiment, the seventh transmission lines 567 (567-1 and 567-2) may include a plurality of antenna signal lines. The seventh transmission lines 567 (567-1 and 567-2) may be electrically connected to fourth connectors 591 (591-1 and 591-2) formed on one surface of the first printed circuit board 550. According to an embodiment, the 7-1th transmission line 567-1 of the seventh transmission lines 567 (567-1 and 567-2) may transfer a signal of an intermediate frequency having a horizontal polarized wave to the antenna module 510 through one 591-1 of the fourth connectors of the first printed circuit board 550 and/or the coaxial cable line 581-1. The coaxial cable lines 581-1 and 581-2 may be signal lines included in the coaxial cable 580 (580-1 and 580-2). According to an embodiment, the 7-2th transmission line 567-2 of the seventh transmission lines 567 (567-1 and 567-2) may transfer a signal of an intermediate frequency having a vertical polarized wave through the other one 591-2 of the fourth connectors of the first printed circuit board 550 and/or the coaxial cable line 581-2. According to an embodiment, the seventh transmission lines 567 (567-1 and 567-2) may be printed on one layer of the first printed circuit board 550.

Since the intermediate frequency signal, which is an RF signal transferred to the antenna module 510 through the seventh transmission lines 567 (567-1 and 567-2), is transferred to the RFIC 513 through the coaxial cables 580 (580-1 and 580-2), the electronic device 500 may mitigate attenuation of the intermediate frequency signal. For example, the attenuation ratio per unit length of the intermediate frequency signal transferred to the antenna module 510 may be about 0.76 dB/mm on the signal line (e.g., the seventh transmission lines 567 (567-1 and 567-2)) on the printed circuit board, about 0.47 dB/mm on the signal line (e.g., the fourth transmission lines 564 (564-1 and 564-2)) on the flexible printed circuit board, and about 0.16 dB/mm on the coaxial cables 580 (580-1 and 580-2). According to an embodiment, the electronic device 101 may reduce the loss of the intermediate frequency signal by configuring the coaxial cable 580 (580-1 and 580-2) having the lowest attenuation ratio per unit length as a part of the transmission path of the intermediate frequency signal.

According to an embodiment, the fourth connectors 591 (591-1 and 591-2) may be disposed adjacent to the IFIC 353 such that the length of the seventh transmission lines 567 (567-1 and 567-2) of the printed circuit board is reduced in order to reduce the loss of the transmission signal transferred from the IFIC 553 through the seventh transmission lines 567 (567-1 and 567-2).

According to an embodiment, in order to reduce the loss of the transmission signal, the first printed circuit board 550 may use the antenna module 510 and coaxial cables 580 (580-1 and 580-2). The coaxial cables 580 (580-1 and 580-2) may include coaxial cable lines 581-1 and 581-2, and may include a conductive material (not illustrated) surrounding the coaxial cable lines 581-1 and 580-2 to reduce signal loss. For example, the coaxial cable 580 (580-1, 580-2) may include a dielectric (not illustrated) surrounding each of the coaxial cable lines 581-1 and 581-2 of a conductive material (e.g., copper) and having a high dielectric constant, and/or a conductive material surrounding the dielectric. In the coaxial cable 580 (580-1 and 580-2), the signal transmission line, the dielectric material, and the conductive material may be disposed coaxially.

According to an embodiment, the intermediate frequency signal up-converted through the IFIC 553 has a higher frequency band than the baseband signal generated by the processor 551. When the signal is transferred, the intermediate frequency signal may cause a greater signal loss than the baseband signal. The coaxial cables 580 (580-1 and 580-2) are formed of a conductive material surrounding the outside to prevent and/or reduce electrical interference, thereby reducing signal loss when transmitting the intermediate frequency signal up-converted through the IFIC 553 to the antenna module 510.

According to an embodiment, the eighth transmission line 568 may extend from the processor 551 to the IFIC 553. The eighth transmission line 568 may transfer a baseband transmission signal. For example, when transmitting a signal, the processor 551 may generate a baseband signal and transmit the generated baseband signal to the IFIC 553 through the eighth transmission line 568. The IFIC 553 may up-convert the baseband signal received from the processor 551 into an intermediate frequency signal. The IFIC 553 may transfer the up-converted intermediate frequency signal to the RFIC 513 through the seventh transmission line 567 (567-1 and 567-2) and/or the coaxial cable 580 (580-1 and 580-2). As another example, when receiving a signal, the IFIC 553 may receive an intermediate frequency signal from the RFIC 513 through the fourth transmission lines 564 (564-1 and 564-2), the coaxial cables 580 (580-1 and 580-2), and/or the seventh transmission lines 567 (567-1 and 567-2). The IFIC 553 may down-convert the received intermediate frequency signal into a baseband signal. The IFIC 553 may transfer the down-converted baseband signal to the processor 551 through the eighth transmission line 568.

According to an embodiment, the second flexible printed circuit board 571 may include a second transmission line 562. The second transmission line 562 may be electrically connected to the first transmission line 561 to supply the control signal or power provided from the first printed circuit board 550. The second transmission line 562 may be electrically connected to the third transmission line 563 to supply the received control signal or power to the second printed circuit board 530.

According to an embodiment, the second printed circuit board 530 may include a connector and/or a signal transmission line for supplying a control signal, power, and ground signal to the antenna module 510. The second printed circuit board 530 may include a third transmission line 563 for providing a control signal and/or power to the antenna module 510, and a connector electrically connected to the third transmission line 563. The third transmission line 563 may be electrically connected to the second transmission line 362. The third transmission line 563 may transfer the control signal or power received from the second flexible printed circuit board 571 to the antenna module 510. The second printed circuit board 530 may include a transmission line and/or a connector for connection between the antenna module 510 and a ground point provided in the electronic device 101.

According to an embodiment, the first flexible printed circuit board 570 may include transmission lines capable of transmitting the signal provided from the antenna module 510 to the second printed circuit board 530 and/or the first printed circuit board 550. For example, the first FPCB 570 may include a fourth transmission line 564 (564-1 and 564-2), a fifth transmission line 565 (5-1th transmission line 565-1 and/or 5-2th transmission line 565-2). The first flexible printed circuit board 570 may include fourth transmission lines 564-1 and 564-2 electrically connected to the RFIC 513. The first FPCB 570 may include a third connector 590 (590-1 and 590-2) for electrical connection with the coaxial cable 580 (580-1 and 580-2) and a fourth transmission line 564 (564-1 and 564-2). The third connector 590 (590-1, 590-2) may receive a transmission signal from the fourth transmission line 564 (564-1, 564-2) or may transmit a transmission signal to the fourth transmission line 564 (564-1, 564-2).

According to an embodiment, a portion of the fourth transmission line 564 (564-1 and 564-2) may extend from the RFIC 513 to one edge of the substrate along one surface of the substrate forming the antenna module 510. The remaining portion of the fourth transmission line 564 (564-1, 564-2) may extend from a portion of the fourth transmission line 564 (564-1, 564-2) positioned at the one edge to the third connector 590 (590-1 and 590-2) along one layer of the first flexible printed circuit board.

According to an embodiment, the fourth transmission line 564 may include a plurality of transmission lines. The fourth transmission line 564 may include a 4-1th transmission line 564-1, which is one of the transmission lines, and a 4-2th transmission line 564-2, which is the other. A plurality of coaxial cables 580 (580-1 and 580-2) and coaxial cable lines 581 (581-1 and 581-2) connected to the fourth transmission line 564 may also be provided. For example, the coaxial cable line 581 (581-1 and 581-2) may include a first coaxial cable line 581-1, which is one of the signal transmission lines, and a second coaxial cable line 581-2, which is the other. The coaxial cable 580 may include a first coaxial cable 580-1 including a first coaxial cable line 581-1 and a second coaxial cable 580-2 including a second coaxial cable line 581-2. The 4-1th transmission line 564-1 may transfer a transmission signal having an intermediate frequency corresponding to a horizontally polarized wave. For example, when transmitting a signal, the 4-1th transmission line 564-1 may transfer an intermediate frequency signal having a horizontally polarized wave up-converted from the IFIC 553 to the RFIC 513 through the first coaxial cable 580-1. According to an embodiment, the 4-2th transmission line 564-2 may transfer an intermediate frequency signal corresponding to a vertically polarized wave. The 4-2th transmission line 564-2 may transfer an intermediate frequency signal corresponding to the vertically polarized wave from the IFIC 553 to the RFIC 513 through the second coaxial cable 580-2.

When receiving a signal from the outside, the 4-1th transmission line 564-1 may transfer an intermediate frequency signal corresponding to the down-converted horizontally polarized wave received from the RFIC 513 to the IFIC 553 through the second coaxial cable 580-2. When receiving a signal from the outside, the 4-2th transmission line 564-2 may transfer an intermediate frequency signal corresponding to the up-converted vertically polarized wave from the IFIC 553 to the RFIC 513 through the second coaxial cable 580-2.

According to an embodiment, the third connector 590 (590-1 and 590-2) may be disposed on the first flexible printed circuit board 570 to transmit a transmission signal received from the RFIC 513 through the coaxial cable 580 (580-1 and 580-2), thereby reducing signal loss. The signal transmitted through the fourth transmission lines 564 (564-1 and 564-2) is an RF signal in an intermediate frequency band of about 9 GHz to 11 Hz, which may cause a signal loss during transmission of the signal. Accordingly, in order to reduce signal loss, the third connector 590 (590-1 and 590-2) is positioned adjacent to the antenna module 510, and it is necessary to reduce additional connectors.

When the third connector 590 (590-1, 590-2) is disposed on the second printed circuit board 530, signal loss may occur due to connectors connecting the first flexible printed circuit board 570 and the second printed circuit board 530. Since the signal transmitted to the antenna module must pass through the signal line formed on the second printed circuit board 530, the movement path of the signal transmitted to the antenna module may increase, and thus additional signal loss may occur.

According to an embodiment, the first flexible printed circuit board 570 may include a fifth transmission line 565 extending from the second printed circuit board 530 and at least partially disposed thereon, and the fifth transmission line may include a 5-1th transmission line 565-1 extending to the RFIC 513 and/or a 5-2th transmission line 565-2 extending to the PMIC 515. The 5-1th transmission line 565-1 and/or the 5-2th transmission line 565-2 may be electrically connected to the second printed circuit board 530 to transmit the control signal received through the second printed circuit board 530 to the PMIC 515 and/or the RFIC 513.

The 5-1 transmission line 565 and the 5-2 transmission line 565-2 of the first flexible printed circuit board 570 may be transmission lines distinguished from each other. For example, the 5-1th transmission line 565 may be a first path among paths of the fifth transmission line 565 included in the MIPI line, and the 5-2th transmission line 565-2 may be a second path distinct from the first path among paths of the fifth transmission line 565 included in the MIPI line. For example, the 5-1th transmission line 565-1 may form a first path in a state of being electrically disconnected from the 5-2th transmission line 565-2, and the 5-2th transmission line 565-2 may form a second path in a state of being electrically disconnected from the 5-1th transmission line 565-1. According to an embodiment, the second transmission line 362 and/or the third transmission line 363 electrically connected to the fifth transmission line 365 are illustrated as one, but like the fifth transmission line 365, the second transmission line 362 and/or the third transmission line 363 may include a plurality of electrically disconnected paths.

According to an embodiment, a portion of the 5-1th transmission line 565-1 may extend from the RFIC 513 to one edge of the edges of the substrate along one surface of the substrate forming the antenna module 510. The remaining portion of the 5-1th transmission line 565-1 may extend from a portion of the 5-1th transmission line 565-1 positioned at one edge to the second printed circuit board 530 along one layer of the first flexible printed circuit board 570.

According to an embodiment, a portion of the 5-2th transmission line 565-2 may extend from the PMIC 515 to one edge of the edges of the substrate along one surface of the substrate forming the antenna module 510. The remaining portion of the 5-2th transmission line 565-2 may be electrically connected to the second printed circuit board 530 along one layer of the first flexible printed circuit board 570 from a portion of the 5-2th transmission line 565-2 positioned at the one edge. For example, the 5-2th transmission line 565-2 may extend from one edge of the substrate to the second printed circuit board 530 along the second path distinct from the first path including the 5-1th transmission line 565-1, and may be electrically connected to the second printed circuit board 530. As another example, the fifth transmission line 565 may be electrically connected to the first printed circuit board 550 through the second transmission line 562 and the third transmission line 563. The second transmission line 562 and the third transmission line 563 are illustrated as one, but are not limited thereto, and may include a plurality of electrically disconnected paths. Specifically, the second transmission line 562 and the third transmission line 563 may include one line included in or connected to the first path of the 5-1th transmission line 565-1, and may include another line included in or connected to the second path of the 5-2th transmission line 565-2.

According to an embodiment, the first flexible printed circuit board 570 may be formed separately from the antenna module 510 and may be connected to the antenna module 510 through a connector (not illustrated). According to an embodiment (not illustrated), the first flexible printed circuit board 570 may be integrally formed with the antenna module 510. The first flexible printed circuit board 570 integrally formed with the antenna module 510 may be connected to the antenna module 510 without a connector, and may reduce the loss of a signal transferred to the antenna module 510 due to impedance mismatch.

According to an embodiment, since the RF signal is connected to the connector formed on the first flexible printed circuit board 570 without passing through the connector connecting the first flexible printed circuit board 570 and the second printed circuit board 530 and/or the second printed circuit board 530 and the first flexible printed circuit board 570, the electronic device 101 may reduce signal loss.

According to an embodiment, since the coaxial cable 580 (580-1 and 580-2) is directly connected to the first flexible printed circuit board 570 of the antenna module, the length of the feeding line connected to the antenna array 511 of the antenna module 510 on the printed circuit board may be reduced, the electronic device 101 may reduce signal loss.

According to an embodiment (not illustrated), the second flexible printed circuit board 571 and the second printed circuit board 530 of the electronic device 101 may be omitted. In this case, the first flexible printed circuit board 370 may be directly connected to the first printed circuit board 350, and the fifth transmission line 365 may be directly connected to the first transmission line 361 and/or the sixth transmission line 366.

Figure 6:
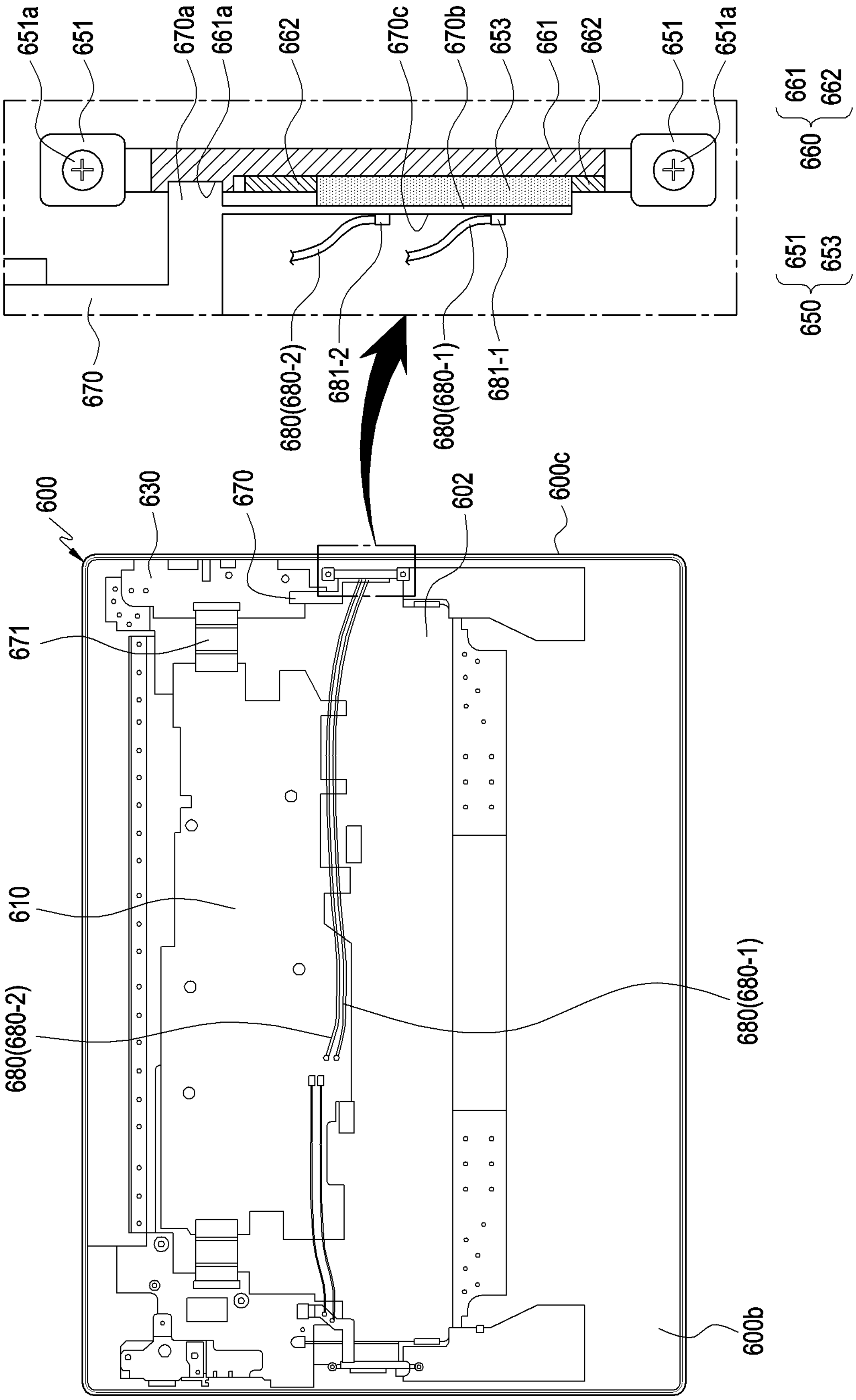
FIG. 6 is a diagram illustrating a plan view of an inner arrangement of an electronic device according to various embodiments.
Figure 7:
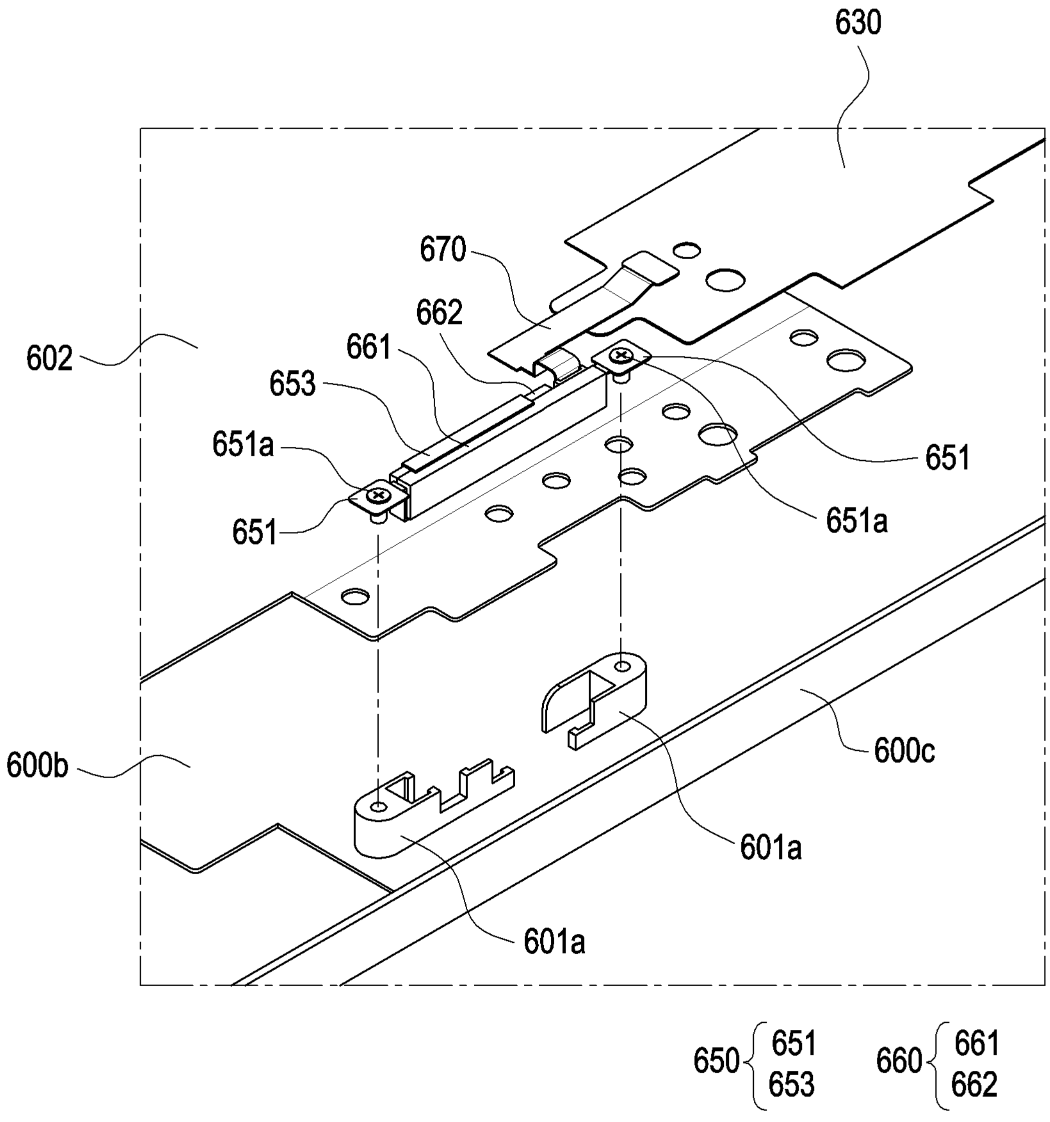
FIG. 7 is a perspective view illustrating a coupling relationship between a housing and an antenna module according to various embodiments.
Figure 8:
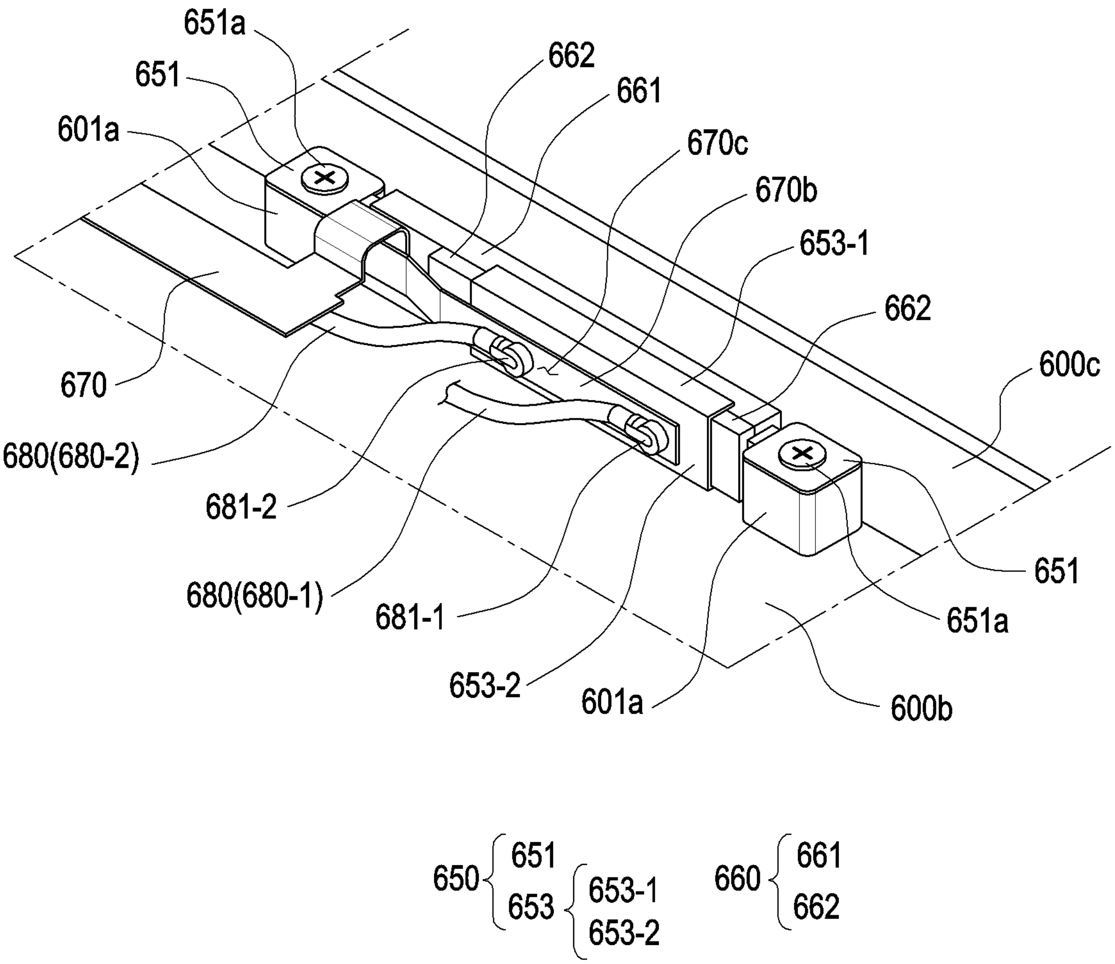
FIG. 8 is a perspective view illustrating a coupling relationship between a housing and an antenna module according to various embodiments.
Figure 9A:
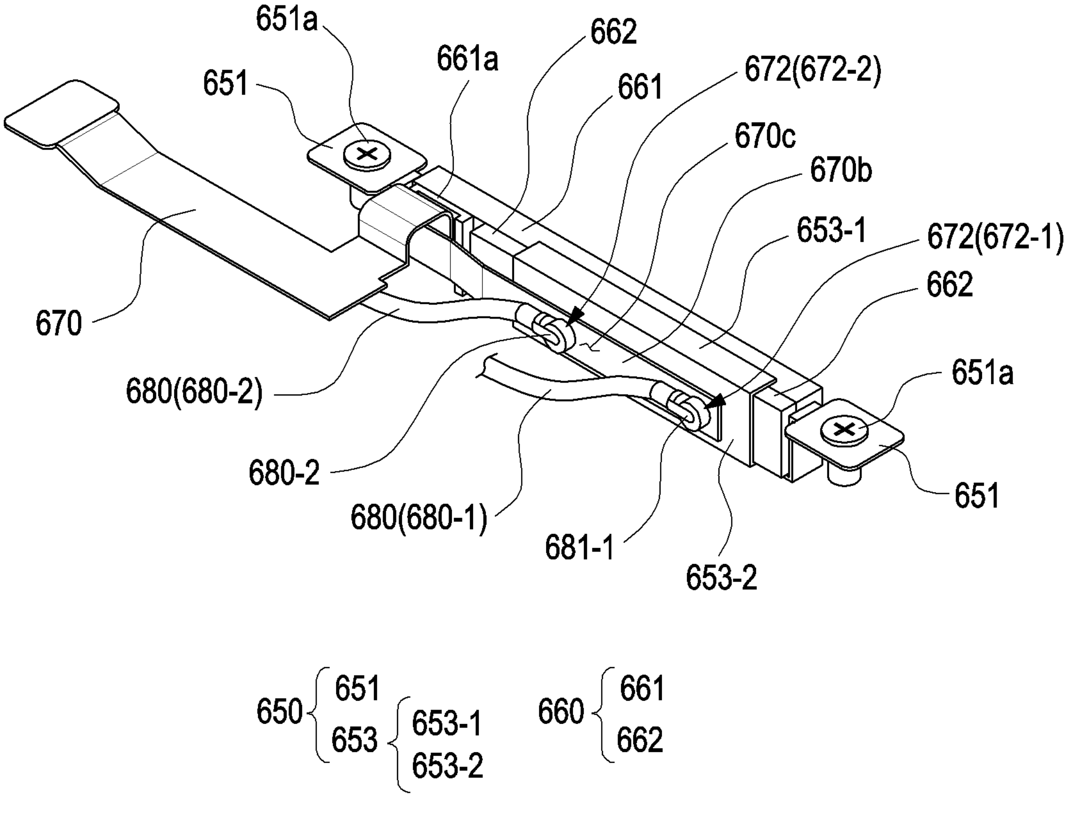
FIG. 9A is a perspective view illustrating a connection relationship between an antenna module and a flexible printed circuit board according to various embodiments.
Figure 9B:
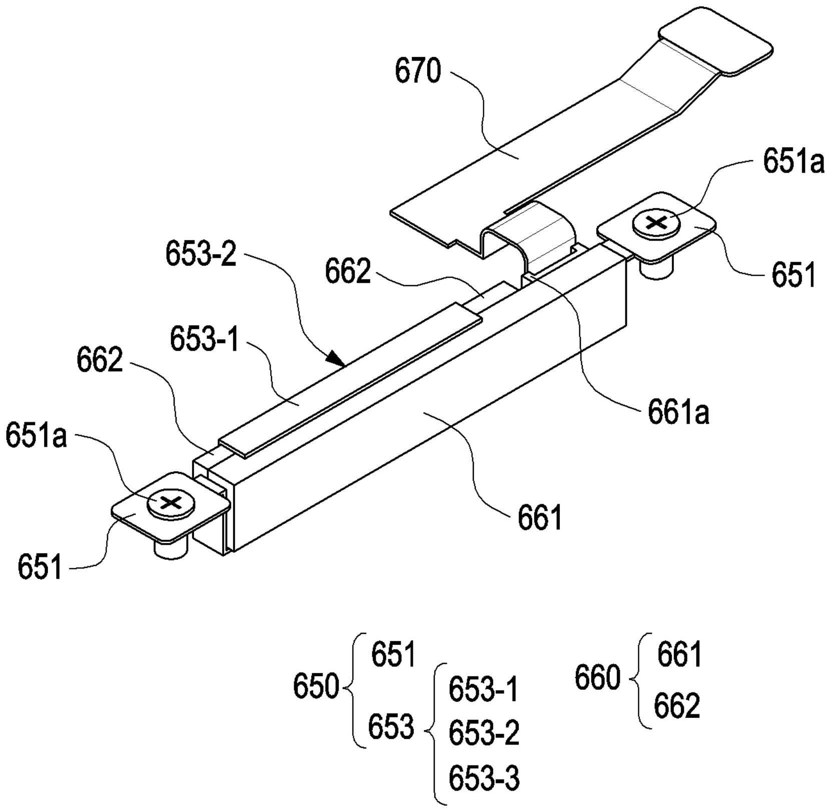
FIG. 9B is a perspective view illustrating a connection relationship between an antenna module and a flexible printed circuit board as viewed in a direction different from that of FIG. 9A according to various embodiments.
Figure 9C:
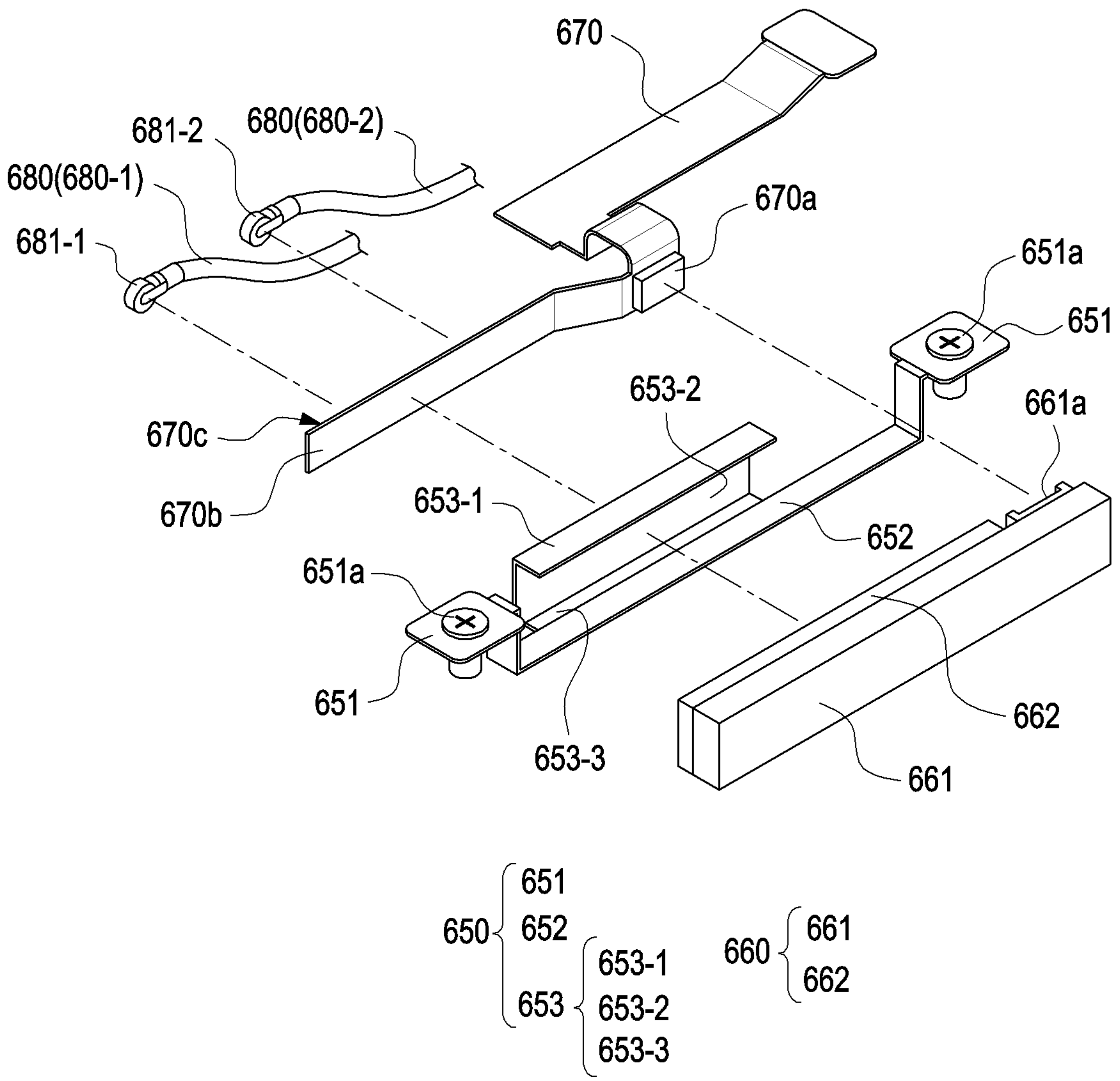
FIG. 9C is an exploded perspective view illustrating an antenna module and a flexible printed circuit board according to various embodiments.
Figure 10:
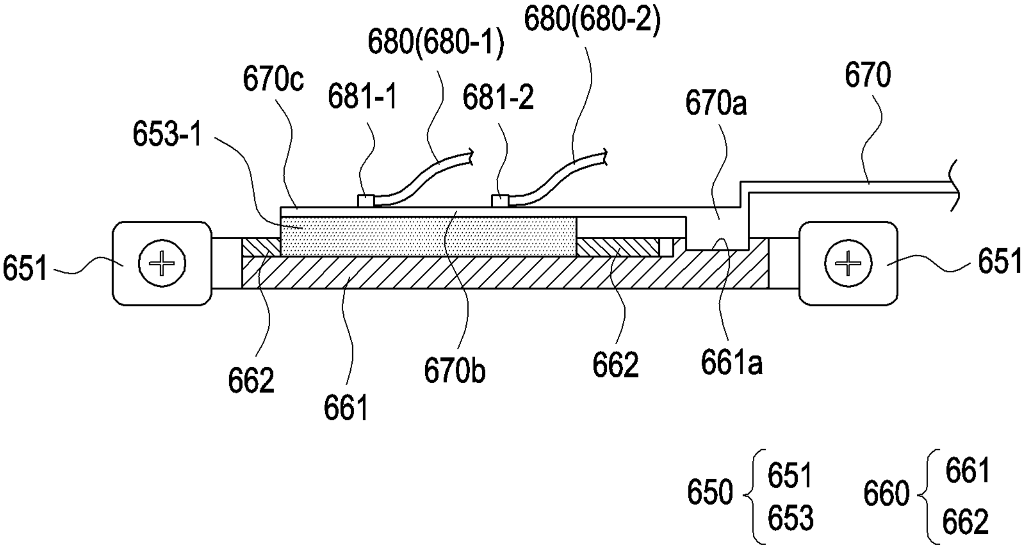
FIG. 10 is a diagram illustrating a plan view of a connection relationship between an antenna module and a flexible printed circuit board according to various embodiments.

FIG. 6 is a diagram illustrating a plan view of an inner arrangement of an electronic device according to various embodiments. FIG. 7 is a perspective view illustrating a coupling relationship between a housing and an antenna module according to various embodiments. FIG. 8 is a perspective view illustrating a coupling relationship between a housing and an antenna module according to various embodiments. FIG. 9A is a perspective view illustrating a connection relationship between an antenna module and a flexible printed circuit board according to various embodiments. FIG. 9B is a perspective view illustrating a connection relationship between an antenna module and a flexible printed circuit board as viewed in a direction different from that of FIG. 9A according to various embodiments. FIG. 9C is an exploded perspective view illustrating a separated state of an antenna module and a flexible printed circuit board according to various embodiments. FIG. 10 is a diagram illustrating a plan view of a connection relationship between an antenna module and a flexible printed circuit board according to various embodiments.

Referring to FIG. 6, an electronic device 101 (e.g., the electronic device 101 of FIGS. 1, 2, 4, and/or 5) may include a housing 600, a bracket 602, a main circuit board 610, a sub circuit board 630, an antenna module 660, a first flexible printed circuit board 670, a second flexible printed circuit board 671, and/or a coaxial cable 680 (680-1 and 680-2).

According to an embodiment, the housing 600 (e.g., the housing 400 of FIG. 4 or the housing 500 of FIG. 5) may include a first surface (not illustrated) (e.g., the front surface 400*a* of FIG. 4) facing in a first direction, a second surface 600*b* (e.g., the rear surface 400*b* of FIG. 4) facing in a second direction opposite to the first direction, and/or a third surface 600*c* (e.g., the side surface 400*c* of FIG. 4). The third surface 600*c* may connect the first surface and the second surface 600*b*. For example, the first surface, the second surface 600*b*, and/or the third surface 600*c* may form an inner space distinct from the outside of the electronic device 101. The housing 600 may be a structure that forms an outer appearance of the electronic device 101. According to an embodiment, the housing 600 may be an inner case of the electronic device 101.

According to an embodiment, the housing 600 may include a material having rigidity. The housing 600 may support components of the electronic device 101 disposed in the inner space. The first surface (not illustrated) of the housing 101 may include a display (not illustrated) (e.g., the display module 160 of FIG. 1). For example, when the electronic device 101 is a tablet personal computer (PC) or a smartphone, the display may be disposed on at least a portion of the first surface or the second surface 600*b* of the housing 600, or may form at least a portion of the first surface or the second surface 600*b*. As another example, when the electronic device 101 is a laptop computer, a keypad (not illustrated) and/or a touch pad (not illustrated) may be disposed on the first surface (not illustrated).

According to an embodiment, the third surface 600*c* may form a side surface of the electronic device 101. The third surface 600*c* may be integrally formed with the second surface 600*b* of the electronic device 101. According to an embodiment, when the electronic device 101 is provided as a laptop computer, the first surface (not illustrated) may include an opening (not illustrated) formed to expose the touchpad to the outside, and/or a plurality of openings (not illustrated) formed to expose the keypad to the outside. The touch pad and the keypad may be disposed such that a portion of the touch pad and the keypad is exposed through an opening to receive an input from a user.

According to an embodiment, the bracket 602 may be disposed inside the electronic device 600 and may be supported by the second surface 600*b* of the housing 601. The bracket 602 may be formed of a conductive material. The bracket 602 may be a plate formed of metal and may occupy a portion of the area of the second surface 600*b*. The bracket 602 may support an internal component of the electronic device 101. The bracket 602 may be an inner case of the electronic device. For example, the bracket 602 may partition an inner space of the electronic device 101.

According to an embodiment, the bracket 602 may include a material having rigidity, and may support the main circuit board 610 (e.g., the first printed circuit board 550 of FIG. 5) and the sub circuit board 530 (e.g., the second printed circuit board 530 of FIG. 5). The bracket 602 may be physically fastened to the main circuit board 610 and/or the sub circuit board 630 by a fixing member. The bracket 602 may be formed of a conductive material and may function as a heat dissipation member or a ground that transfers heat generated from the main circuit board 610 and/or the sub circuit board 630 and discharges the heat to the outside. For example, the bracket 602 may be connected to the main circuit board 610 (e.g., the first printed circuit board 550 of FIG. 5) and/or the sub circuit board 630 (e.g., the second printed circuit board 530 of FIG. 5) and a heat transfer member formed of a conductive material. As another example, the bracket 602 may be electrically connected to a ground portion of the main circuit board 610 and/or the sub circuit board 630, and may provide a ground to the main circuit board 610 and/or the sub circuit board 630.

According to an embodiment, the main circuit board 610 may be disposed in the housing. For example, the main circuit board 610 may be disposed in at least a partial area of the bracket 602 to be supported. The main circuit board 610 may be equipped with a processor (e.g., the processor 120 of FIG. 1, the first communication processor 212 of FIG. 2, the second communication processor 214 of FIG. 2, or the processor 551 of FIG. 5), an IFIC (e.g., the IFIC 553 of FIG. 5), memory, and/or an interface. The electronic device 101 may include a heat transfer member thermally connecting at least one of the processor and the IFIC with the bracket 602 to dissipate the heat generated from the processor and/or the IFIC disposed on the main circuit board 610.

According to an embodiment, the sub circuit board 630 may be disposed in the housing 600. For example, the sub circuit board 630 (e.g., the second printed circuit board 530 of FIG. 5) may be supported by the bracket 602. The sub circuit board 630 may be disposed in the inner space of the electronic device 101, and at least a portion of the sub circuit board 630 may be disposed to overlap the bracket 602. The sub circuit board 630 may be disposed adjacent to the antenna module 660 (e.g., the antenna module 510 of FIG. 5). The sub circuit board 630 may include a connector corresponding to the first flexible printed circuit board 670 such that the antenna module 660 and the first flexible printed circuit board 670 (e.g., the first flexible printed circuit board 570 of FIG. 5) may be connected to each other.

The sub circuit board 630 may supply power to the antenna module 660 and may provide a signal for controlling a circuit (e.g., the RFIC 513 or the PMIC 515 of FIG. 5) included in the antenna module 610. The sub circuit board 630 may be connected to a ground signal line of the antenna module to provide a ground point to the antenna module 660.

According to an embodiment, the antenna module 660 may be disposed in the housing 600. The antenna module 660 may include a first surface facing outward of the electronic device 101 and a second surface facing in a direction different from the first surface. According to an embodiment, the antenna module 660 may include a substrate 661 (e.g., the printed circuit board 310 of FIG. 3) on which a plurality of conductive patches are formed. According to an embodiment, the antenna module 660 may include a shielding member 662 (e.g., the shielding member 390 of FIG. 3) including a PMIC (e.g., the PMIC 515 of FIG. 5) and an RFIC (e.g., the RFIC 513 of FIG. 5). For example, the substrate 661 may form at least a portion of the first surface facing outward of the electronic device 101. For example, the substrate 661 may form at least a portion of the second surface facing in a direction different from the direction of the first surface. For example, the shielding member 662 may form at least a portion of the second surface facing in a direction different from the direction of the first surface. The shielding member 662 may include a shield can. The shielding member 662 is not limited thereto, and may include various members that are coupled to the substrate 661 and may embed and/or mount a PMIC (e.g., the PMIC 515 of FIG. 5) and/or an RFIC (e.g., the RFIC 513 of FIG. 5). As an example, the first surface may be formed as a front surface of the substrate 661, and the second surface may be formed as a combination of a rear surface of the substrate 661 and a rear surface of the shielding member 662.

According to an embodiment, the antenna module 660 may include a substrate 661 (e.g., the printed circuit board 310 of FIG. 3) on which a plurality of conductive patterns (e.g., the antenna array 330 of FIG. 3) are disposed, and an interposer printed circuit board (or a stacked printed circuit board) including an RFIC (e.g., the RFIC 352 of FIG. 3) and a PMIC (e.g., the PMIC 354 of FIG. 3) and may be formed of the shielding member 662. For example, the substrate 661 may form at least a portion of the first surface facing outward of the electronic device 101. The substrate 661 and/or the interposer printed circuit board (or a stacked printed circuit board) 662 may form at least a portion of the second surface facing in a direction different from the direction of the first surface. As an example, the first surface may be formed as a front surface of the substrate 661, and the second surface may be formed as a combination of the substrate 661 and the interposer printed circuit board (or a stacked printed circuit board) 662.

According to an embodiment, the substrate 661 and the shielding member 662 may include a second surface facing in a direction different from the first surface. For example, the second surface may face in a direction opposite to the direction in which the first surface faces. As another example, the second surface may face in a direction perpendicular to or inclined from the direction in which the first surface faces.

According to an embodiment, the antenna module 660 may be disposed adjacent to the third surface 600*c* (e.g., a side surface) of the housing 600 while being supported by the second surface 600*b* of the housing 600 to enhance communication performance with an external network. If the antenna module 660 is disposed adjacent to the third surface 600*c*, the influence of the conductive material included in the internal component of the electronic device 101 may be reduced. In order to have directivity of a pattern radiated from the antenna module 660, the antenna module 660 may be formed such that the direction of the beam pattern generated by an antenna array (e.g., the antenna array 511 of FIG. 5) faces the third surface 600*c*. In order to maintain the directivity of the beam emitted from the antenna array (e.g., the antenna array 511 of FIG. 5), the housing 600 may form an area of the third surface 600*c* corresponding to the area in which the beam pattern of the antenna array is emitted as a non-conductive member. However, the disclosure is not limited thereto, and the housing 600 may form the third surface 600*c* as a non-conductive member. If the third surface 600*c* is formed of a non-conductive member and the second surface 600*b* and the third surface 600*c* are formed of different materials, the second surface 600*b* and the third surface 600*c* of the housing 600 may be formed through double injection molding, or after the second surface 600*b* and the third surface 600*c* are separately molded, the molded second surface 600*b* and the third surface 600*c* may be coupled through bonding. When a portion of the third surface 600*c* is a non-conductive member, the housing 600 may be formed by double injection molding. According to an embodiment, the antenna module 660 may be formed such that the direction of the beam pattern generated by an antenna array (e.g., the antenna array 511 of FIG. 5) faces the first surface (not illustrated) and/or the second surface 600*b*.

According to an embodiment, the antenna module 660 may include a first flexible printed circuit board 670 (e.g., the first flexible printed circuit board 570 of FIG. 5), and the first flexible printed circuit board 670 may include a second connector 670*a* and/or a third connector 672 (672-1 and 672-2) (e.g., the third connector 590 (590-1 and 590-2) of FIG. 5). According to an embodiment, the first flexible printed circuit board 670 may be understood as a separate component from the antenna module 660.

The antenna module 660 may be formed of a plurality of layers, and may be formed integrally with or separately from the first flexible printed circuit board 670. According to an embodiment, the antenna module 660 may include a rigid-flexible printed circuit board (RFPCB) including a flexible printed circuit board in a printed circuit board. For example, the antenna module 660 may include an antenna array (e.g., the antenna array 511 of FIG. 5) formed on the printed circuit board, an RFIC (e.g., the RFIC of FIG. 2 (the first RFIC 222, the second RFIC 224, the third RFIC 226, or the RFIC 513 of FIG. 4)), and/or a PMIC (e.g., the power management module 188 of FIG. 1), and may further include the first flexible printed circuit board 670 extending from the printed circuit board.

According to an embodiment, the antenna array (e.g., the antenna array 511 of FIG. 5) may be formed on one surface of the substrate 661 of the antenna module 660 facing the third surface 600*c* of the housing 600 or a layer close to one surface of layers forming the substrate 660. An RFIC (not illustrated) (e.g., the RFIC 513 of FIG. 5) and/or a PMIC (not illustrated) (e.g., the PMIC 515 of FIG. 5) may be formed on the other surface distinct from the one surface of the substrate 661 of the antenna module 660. In order to electrically connect the RFIC and the antenna array (e.g., the antenna array 511 of FIG. 5), the substrate 661 may include a via and/or a transmission line connecting the RFIC and the antenna array.

The first flexible printed circuit board 670 may extend from one of the plurality of layers forming the printed circuit board. A transmission line (e.g., the fourth transmission line 564 or the fifth transmission line 565 of FIG. 5) electrically connected to the RFIC and/or the PMIC may be printed on the one layer. The printed circuit board may include a conductive via for electrically connecting the transmission line with the RFIC and/or the PMIC. The printed transmission line may extend to a transmission line printed on one layer of the first flexible printed circuit board 670. For example, the first flexible printed circuit board 670 may include some of transmission lines extending from the RFIC and/or the PMIC.

According to an embodiment, the electronic device 300 may include an antenna module 660 formed separately from the first flexible printed circuit board 670.

According to an embodiment (not illustrated), the first flexible printed circuit board 670 and the antenna module 660 may be integrally formed with each other in the electronic device 300. The antenna module 660 integrally formed with the first flexible printed circuit board 670 may omit a connector for connection with the first flexible printed circuit board 670, thereby reducing the loss of the transmission signal between the RFIC and the processor or the IFIC (e.g., the fourth RFIC 228 of FIG. 2 or the IFIC 553 of FIG. 5) included in the first printed circuit board 550 generated by the connector for connection between the first flexible printed circuit board 670 and the antenna module 610.

According to an embodiment, at least a portion of the first flexible printed circuit board 670 may be disposed on the second surface of the antenna module 660. The first flexible printed circuit board 670 may electrically connect the main circuit board 610 and the antenna module 660. For example, the first flexible printed circuit board 670 may be electrically connected to the first connector 661*a* of the substrate 661 through the second connector 670*a*. For example, the first flexible printed circuit board 670 may be electrically connected to the sub circuit board 630, and may be electrically connected to the main circuit board 610 through the second flexible printed circuit board 671 electrically connecting the sub circuit board 630 and the main circuit board 610.

According to an embodiment, the first flexible printed circuit board 670 may include, on one surface thereof, a third connector 672 (672-1 and 672-2) (e.g., the third connector 590 (590-1 and 590-2) of FIG. 5) for connection with the coaxial cable 680 (680-1 and 680-2) (e.g., the coaxial cable 580 (580-1 and 580-2) of FIG. 5) and/or a fifth connector (not illustrated) for connection with the sub circuit board 630. The first flexible printed circuit board 670 may include transmission lines having a conductive pattern (e.g., a portion of the fourth transmission line 564 or the fifth transmission line 565 of FIG. 5). In an area corresponding to an end portion of a fourth transmission line (e.g., the fourth transmission line 564 of FIG. 4) among the transmission lines, a coverlay film forming one surface of the first flexible printed circuit board 670 may be removed to expose the end portion of the fourth transmission line. The fourth transmission line may include two signal transmission lines for transmitting a signal having a vertically polarized wave and/or a signal having a horizontally polarized wave. The first flexible printed circuit board 670 may include third connectors 672 (672-1 and 672-2) (e.g., the third connectors 590-1 and 590-2 of FIG. 3) connected to end portions of the plurality of exposed fourth lines, respectively. According to an embodiment, the first flexible printed circuit board 670 may have a fifth connector (not illustrated) in an area corresponding to an end portion of a fifth transmission line (e.g., the fifth transmission line 565 of FIG. 5). The fifth connector (not illustrated) may be electrically connected to a signal line included in the first flexible printed circuit board 670 and/or a fifth transmission line corresponding to the transmission line. The fifth connector (not illustrated) may electrically connect the first flexible printed circuit board 670 and the sub circuit board 630.

When the coaxial cable 580 (580-1 and 580-2) is fastened to a connector for electrical connection with the sub circuit board 530, a signal loss may occur in the fifth connector (not illustrated), and a signal loss may occur due to a signal transmission line of the sub circuit board 530. According to an embodiment, since the processor (e.g., the processor 551 of FIG. 5) transmits a signal to the antenna module 610 through the first flexible printed circuit board 670 including the third connector 672 (672-1 and 672-2) (e.g., the third connector 590-1 and 590-2 of FIG. 5) fastened to the coaxial cable 580 (580-1 and 580-2), the number of connectors positioned on the signal transfer path may be reduced. Since the coaxial cables 680 (680-1 and 680-2) are connected to the first connector (not illustrated) to directly transmit a transmission signal to the antenna module 610, the electronic device 101 according to an embodiment may reduce the occurrence of signal loss due to a transmission line (e.g., micro strip) of the sub circuit board 530 and the fifth connector (not illustrated). According to an embodiment, the electronic device 101 may increase the internal space utilization of the electronic device 101 by connecting coaxial cables 680 (680-1 and 680-2) to one surface of the antenna module 660.

In order to reduce loss of signals including information transferred to the antenna module 660, the coaxial cable 680 (680-1 and 680-2) may be fastened to a third connector (e.g., the third connector 590-1 and 590-2 of FIG. 5) electrically connected to a transmission line of the first flexible printed circuit board 670, and may be fastened to fourth connectors (e.g., the fourth connectors 591-1 and 591-2 of FIG. 5) connected to antenna signal transmission lines (e.g., the seventh transmission lines 567-1 and 567-2 of FIG. 5) of the main circuit board 610. The coaxial cables 680 (680-1 and 680-2) may connect a processor (e.g., the processor 551 of FIG. 5) or an IFIC (e.g., the IFIC 553 of FIG. 5) included in the main circuit board 610 with an RFIC (e.g., the RFIC 513 of FIG. 5) included in the antenna module 660.

According to an embodiment, the second flexible printed circuit board 671 may connect the main circuit board 610 and the sub circuit board 630. The second flexible printed circuit board 671 may include a conductive pattern printed on at least one of a plurality of layers and a plurality of coverlays. The conductive pattern may include a control signal line transferred from the main circuit board 610 to the antenna module 610, and may further include a power supply line and/or a ground signal line. The signal transferred through the control signal line may include signals for controlling the RFIC and/or the PMIC transferred from the processor.

According to an embodiment, the antenna module 660 may be selectively operated by a processor (e.g., the processor 551 of FIG. 5) according to the direction of a base station present outside the electronic device 101, and may receive a signal from the base station or may transmit a signal to the base station. The antenna module 660 may process, e.g., the signal generated by a processor (e.g., the processor 551 of FIG. 5) to transmit a 5G RF signal through an antenna array (e.g., the antenna array 311 of FIG. 3 or the antenna array 511 of FIG. 5).

According to an embodiment, the electronic device 101 may integrally form the antenna module 660 and the first flexible printed circuit board 670, thereby reducing the number of connectors on the signal transfer path. The electronic device 101 such as a tablet PC or a laptop computer that supports cellular communication, particularly communication in a high frequency band such as mmWave, may have a long movement path for transmitting a signal from the main circuit board 610 including a processor (e.g., the processor 551 of FIG. 5) to the antenna module 660, and may thus have more signal loss than that of a small electronic device (e.g., a smartphone). According to an embodiment, the electronic device 101 may form at least a portion of a feeding line for transferring a signal from a processor (e.g., the processor 551 of FIG. 5) to the antenna module 660 as a coaxial cable. The antenna module (e.g., RFIC of the antenna module) or the processor (or IFIC) may be disposed adjacent to the connector of the coaxial cable to reduce the length of the feeding line other than the coaxial cable.

According to an embodiment, the coaxial cables 580 (580-1 and 580-2) of the electronic device 101 may be connected to the antenna module 660 through the first flexible printed circuit board 670.

According to an embodiment (not illustrated), the electronic device 101 may integrate the antenna module 660 with the first flexible printed circuit board 670 on which a connector for the coaxial cable 680 (680-1 and 680-2) is formed, thereby reducing the loss of signals including data transferred to the outside through the antenna.

According to an embodiment, the electronic device 101 may include a supporting member 650 for fixing the antenna module 660 to the housing 600. The supporting member 650 may include a coupling portion 651 screwed to the housing 600 and a fixing portion 653 supporting the antenna module 660.

According to an embodiment, the coaxial cable 680 (680-1 and 680-2) may include a sixth connector 680-1 and 680-2 for electrically connecting to a third connector (e.g., the third connector 580-1 and 580-2 of FIG. 5) of the first flexible printed circuit board 670.

Referring to FIG. 7, the supporting member 650 may include a coupling portion 651 and a fixing portion 653. For example, the coupling portion 651 may be screwed 651*a* to the housing 600. As another example, the coupling portion 651 may be coupled to the housing 600 by pin coupling, welding coupling, and/or other physical coupling methods. The coupling portion 651 may be coupled to the seating portion 601*a* formed on the second surface 600*b* of the housing 600. As an example, the seating portion 601*a* may have a fastening hole for screwing with the coupling portion 651.

According to an embodiment, the seating portion 601*a* may be disposed adjacent to the third surface 600*c* of the second surface 600*b* of the housing 600. According to an embodiment, the seating portion 601*a* may be formed on the third surface 600*c* of the housing 600.

According to an embodiment, the first flexible printed circuit board 670 may be electrically connected to a main circuit board (e.g., the main circuit board 670 of FIG. 6) through the sub circuit board 630. According to an embodiment, the first flexible printed circuit board 670 may be directly connected to a main circuit board (e.g., the main circuit board 610 of FIG. 6).

According to an embodiment, the supporting member 650 may be coupled to the housing 660, and at least a portion of the supporting member 650 may support the antenna module 660. As an example, the supporting member 650 may include a fixing portion 653 for fixing and/or supporting the antenna module 660.

Referring to FIGS. 8 and 9A, 9B and 9C, at least a portion of the first flexible printed circuit board 670 may be disposed on the second surface of the antenna module 660. The first flexible printed circuit board 670 may electrically connect the main circuit board (e.g., the main circuit board 610 of FIG. 6) and the antenna module 660.

According to an embodiment, the electronic device 101 may include a cable. The cable may be connected to the seating surface 670*c* formed by the first flexible printed circuit board 670 and may be electrically connected to the antenna module 660. For example, the cable may be the coaxial cable 680 (680-1 and 680-2). As another example, the cable may be provided as an RF cable and/or a conductive line.

According to an embodiment, the coaxial cables 680 (680-1 and 680-2) may be connected to the seating surface 670*c* of the first flexible printed circuit board 670 through the sixth connectors 681-1 and 681-2. For example, the seating surface 670 may be formed as one surface of a portion 670*b* of the first flexible printed circuit board 670 that is directly or indirectly disposed and/or connected to the second surface of the antenna module 660. For example, the seating surface 670 may be configured as a surface opposite to the surface disposed on the supporting member 650 of the first flexible printed circuit board 670.

Referring to FIGS. 9A, 9B, 9C, and 10, the supporting member 650 may include, e.g., a pair of coupling portions 651, a bottom portion 652 connecting the pair of coupling portions 651, and a fixing portion 653 extending from the bottom portion 652. As another example, one coupling portion 651 may be configured.

According to an embodiment, the bottom portion 652 may be interpreted as a component separate from the fixing portion 653. According to an embodiment, the bottom portion 652, together with the fixing portion 653, may be interpreted as one component.

According to an embodiment, the bottom portion 652 may extend to connect the pair of coupling portions 651. The bottom portion 652 may support at least a portion of the lower end of the antenna module 660.

According to an embodiment, the fixing portion 653 may include a first fixing portion 653-1, a second fixing portion 653-2, and/or a third fixing portion 653-3. The third fixing portion 653-1 may extend from, e.g., the bottom portion 652. The third fixing portion 653-1 may support at least a portion of the lower end of the antenna module 660 together with the bottom portion 652. The second fixing portion 653-2 may extend from, e.g., the third fixing portion 653-3. The second fixing portion 653-2 may support at least a portion of the second surface of the antenna module 660. For example, the second fixing portion 653-2 may support at least a portion of the second surface of the shielding member 662 of the antenna module 660. The first fixing portion 653-1 may extend from, e.g., the second fixing portion 653-1. The first fixing portion 653-1 may support at least a portion of the upper end of the antenna module 660. For example, the first fixing portion 653-1 may support at least a portion of the upper end of the shielding member 663 and/or the substrate 661 of the antenna module 660.

According to an embodiment, the antenna module 660 may include a first connector 661*a* to be connected to the first flexible printed circuit board 670. For example, the first connector 661*a* may be formed on at least a portion of the second surface of the substrate 661. According to an embodiment, the first flexible printed circuit board 670 may include a second connector 670*a* to be electrically connected to the antenna module 660. For example, the second connector 670*a* may be formed in one area of the first flexible printed circuit board 670 and may be coupled and/or connected to the first connector 661*a* of the antenna module 660. Accordingly, the first flexible printed circuit board 670 and the antenna module 660 may be electrically connected to each other.

According to an embodiment, the RFIC and/or the PMIC may be disposed on the second surface of the substrate 661 of the antenna module 660, and the shielding member may be disposed on the second surface to surround the RFIC and/or the PMIC.

Figure 11A:
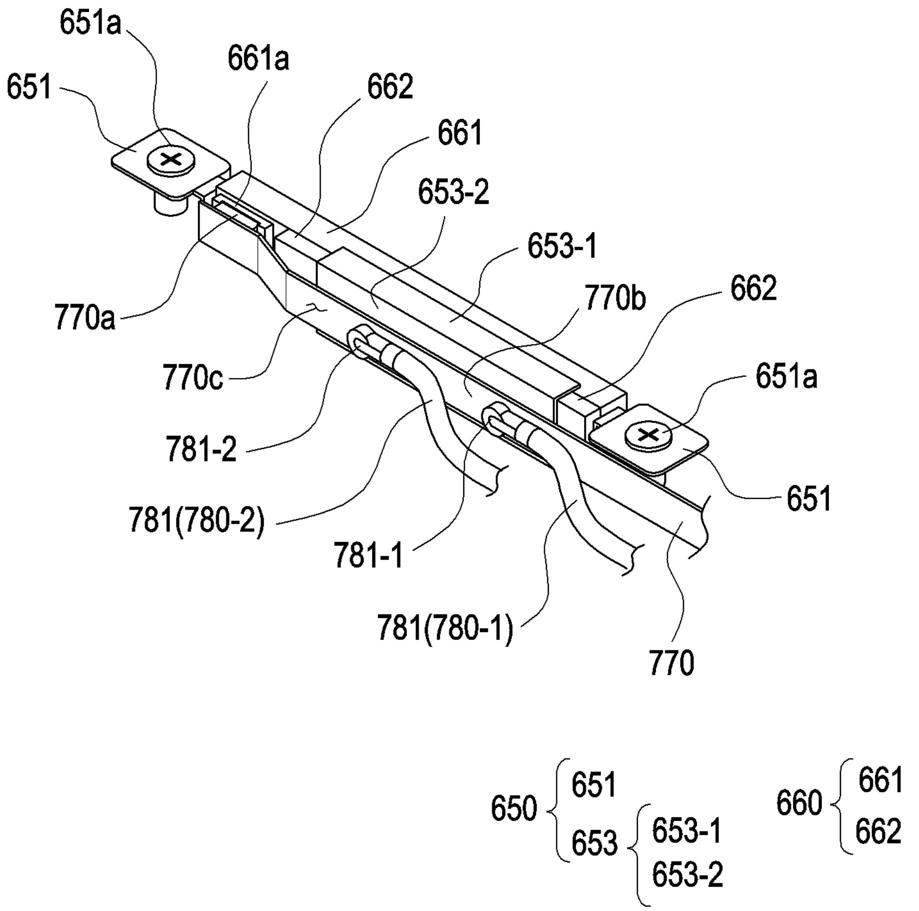
FIG. 11A is a perspective view illustrating an antenna module and a flexible printed circuit board according to various embodiments.
Figure 11B:
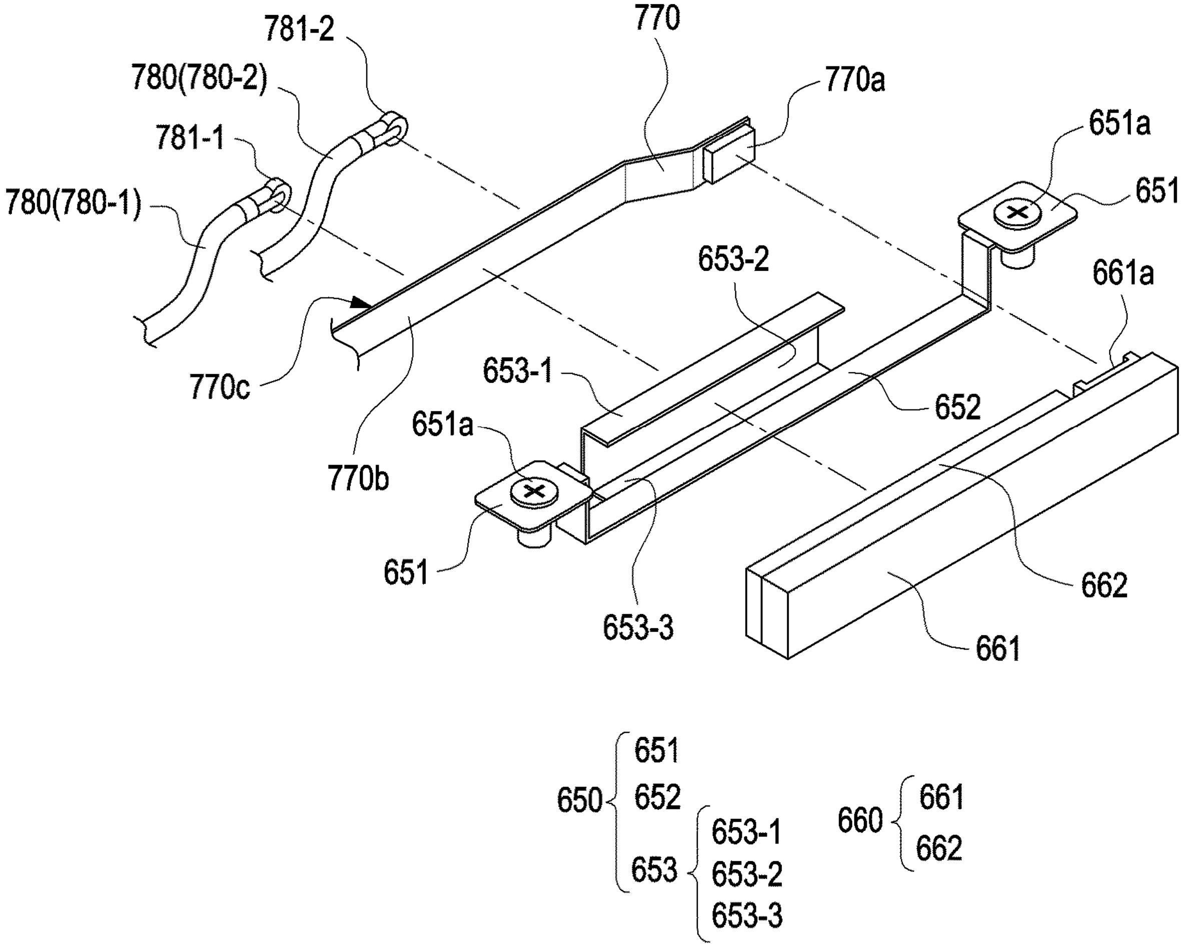
FIG. 11B is an exploded perspective view of an antenna module and a flexible printed circuit board according to various embodiments.
Figure 12:
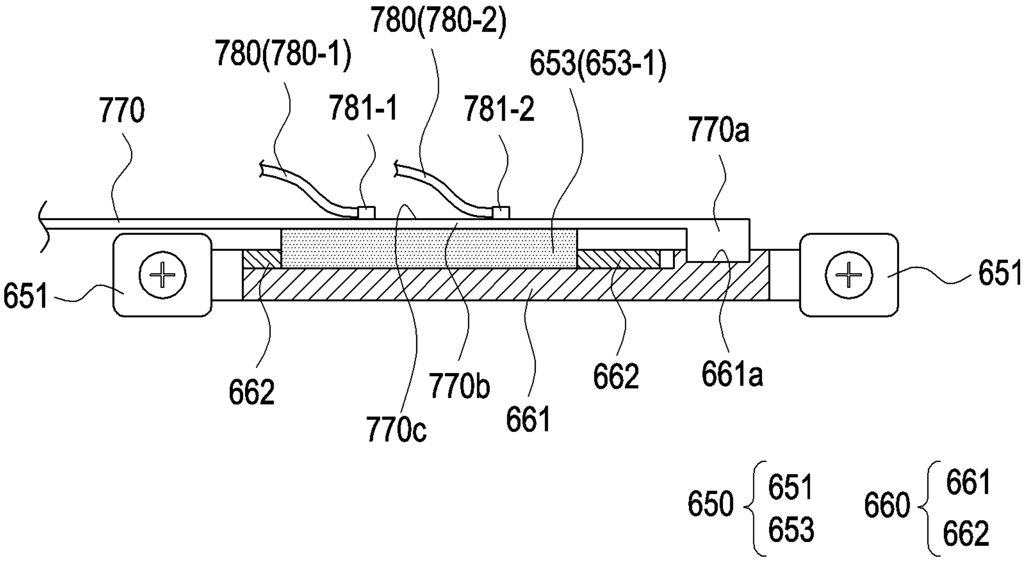
FIG. 12 is a diagram illustrating a plan view of a connection relationship between an antenna module and a flexible printed circuit board according to various embodiments.

FIG. 11A is a perspective view illustrating an antenna module and a flexible printed circuit board according to various embodiments. FIG. 11B is an exploded perspective view illustrating an antenna module and a flexible printed circuit board according to various embodiments. FIG. 12 is a diagram illustrating a plan view of a connection relationship between an antenna module and a flexible printed circuit board according to various embodiments.

The configuration of the supporting member 650 and the antenna module 660 of FIGS. 11A, 11B, and 12 may be identical in whole or part to the configuration of the supporting member 650 and the antenna module 660 of FIGS. 6 to 10.

Referring to FIGS. 11A, 11B, and 12, an electronic device (e.g., the electronic device 101 of FIG. 6) according to various embodiments may include a first flexible printed circuit board 770 and/or a coaxial cable 780.

According to an embodiment, the first flexible printed circuit board 770 may electrically connect the main circuit board (e.g., the main circuit board 610 of FIG. 6) and the antenna module 660. The first flexible printed circuit board 770 may have, e.g., a second connector 770*a* for coupling and/or connection with the first connector 661*a* of the antenna module 660.

According to an embodiment, one area 770*b* of the first flexible printed circuit board 770 may be coupled to the second fixing portion 653-2 of the supporting member 650. The first flexible printed circuit board 770 may be coupled to the second fixing portion 653-2 through, e.g., a double-sided tape, but is not limited thereto. For example, the first flexible printed circuit board 770 may have a seating surface 770*c* formed on a surface opposite to the surface where the antenna module 660 is coupled to the second fixing portion 653-2. A coaxial cable 780 (780-1 and 780-2) (e.g., the coaxial cable 680 (680-1 and 680-2) of FIG. 6) may be connected to the seating surface 770*c*. For example, the coaxial cables 780 (780-1 and 780-2) may be connected to the seating surface 770*c* through the sixth connectors 781-1 and 781-2.

According to an embodiment, the coaxial cables 780 (780-1 and 780-2) may be connected to the seating surface 770*c* through the sixth connectors 781-1 and 782. The coaxial cables 780 (780-1 and 780-2) may be electrically connected to the antenna module 660 through the first flexible printed circuit board 770. The coaxial cables 780 (780-1 and 780-2) may be electrically connected to, e.g., a main circuit board (the main circuit board 610 of FIG. 6).

According to an embodiment, the antenna module 660 may have a first area 661*a* formed on the second surface thereof for electrical connection with a main circuit board (e.g., the main circuit board 610 of FIG. 6). For example, the first area 661*a* may be provided as the first connector 661*a* formed on the second surface of the substrate 661. The first area 661*a* may be electrically connected to the second area 770*a* of the first flexible printed circuit board 770. For example, the second area 770*a* may be provided as the second connector 770*a* formed on the flexible printed circuit board 770.

As an example, in the electronic device 101 (e.g., the electronic device 101 of FIG. 6) of the disclosure, as illustrated in FIG. 9C, the first flexible printed circuit board 770 may extend in two opposite directions of the second connector 670*a*. As another example, in the electronic device 101 (e.g., the electronic device 101 of FIG. 6) of the disclosure, as illustrated in FIG. 11B, the first flexible printed circuit board 770 may extend in one direction with respect to the second connector 770*a*.

Figure 13:
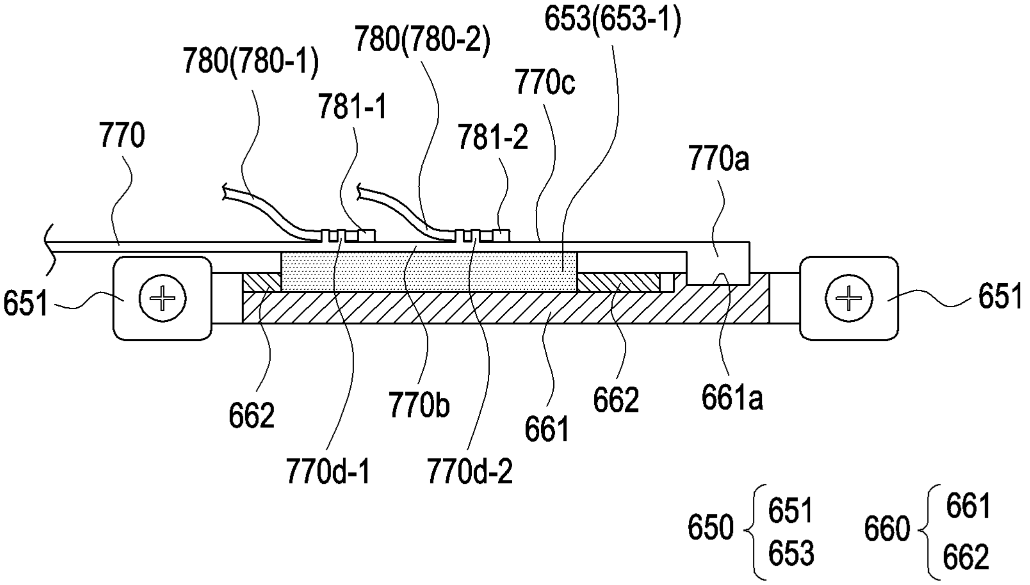
FIG. 13 is a diagram illustrating a plan view of a connection relationship between an antenna module and a flexible printed circuit board according to various embodiments.

FIG. 13 is a plan view illustrating a connection relationship between an antenna module and a flexible printed circuit board according to an embodiment of the disclosure.

The configuration of the supporting member 650, the antenna module 660, the first flexible printed circuit board 770, and the coaxial cable 780 (780-1 and 780-2) of FIG. 13 may be identical in whole or part to the configuration of the supporting member 650, the antenna module 660, the first flexible printed circuit board 770, and the coaxial cable 780 (780-1 and 780-2) of FIGS. 11A, 11B and 12.

Referring to FIG. 13, the first flexible printed circuit board 770 may include mounting portions 770*d*-1 and 770*d*-2. The mounting portions 770*d*-1 and 770*d*-2 may be disposed in one area 770*b* in which the first flexible printed circuit board 770 is coupled to the fixing portion 653. For example, the mounting portions 770-1 and 770-2 may be disposed on an upper end of the one area 770*b* of the first flexible printed circuit board 770. As another example, the mounting portions 770-1 and 770-2 may be disposed on one surface 770*c* of the first flexible printed circuit board 770 where the coaxial cable 780 is coupled. For example, the coaxial cables 780 (780-1 and 780-2) may be mounted on the mounting portions 770*d*-1 and 770*d*-2 through a clip structure. The coaxial cables 780 (780-1 and 780-2) may be coupled to the mounting portions 770*d*-1 and 770*d*-2 so as to be fixed inside the electronic device (e.g., the electronic device 101 of FIG. 6). Accordingly, even when vibration and/or impact occurs on the electronic device (e.g., the electronic device 101 of FIG. 6) by the use and/or movement of the electronic device (e.g., the electronic device 101 of FIG. 6), separation of the sixth connectors 781-1 and 781-2 of the coaxial cable 780 (780-1 and 780-2) from the first flexible printed circuit board 770 may be restricted.

Figure 14:
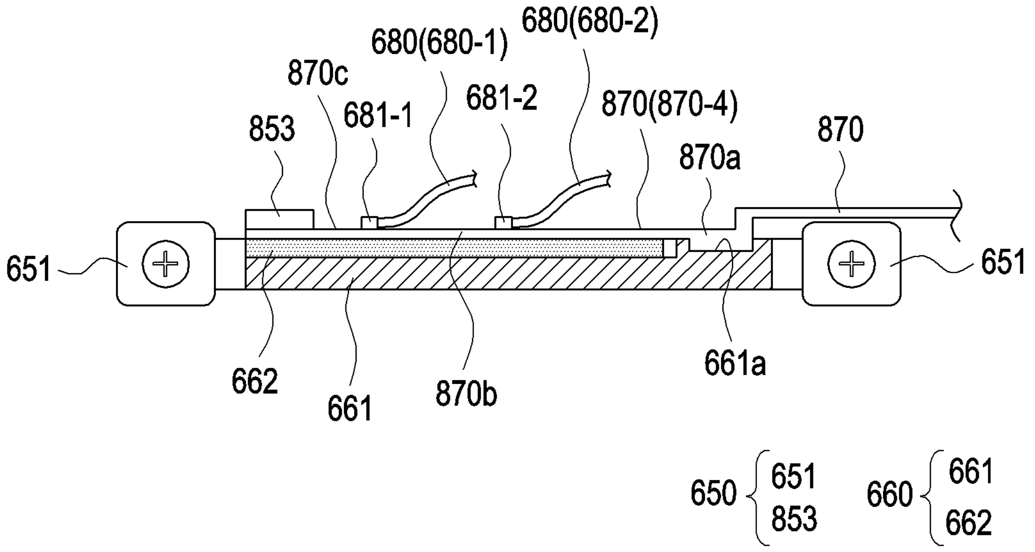
FIG. 14 is a diagram illustrating a plan view of a connection relationship between an antenna module and a flexible printed circuit board according to various embodiments.

FIG. 14 is a diagram illustrating a plan view of a connection relationship between an antenna module and a flexible printed circuit board according to various embodiments.

The configuration of the coupling portion 651, the antenna module 660, and the coaxial cable 680 (680-1 and 680-2) of FIG. 14 may be identical in whole or part to the configuration of the coupling portion 651, the antenna module 660, and the coaxial cable 680 (680-1 and 680-2) of FIGS. 6 to 10.

According to various embodiments, an electronic device (e.g., the electronic device 101 of FIG. 6) may include a first flexible printed circuit board 870.

According to an embodiment, the first flexible printed circuit board 870 may electrically connect the main circuit board (e.g., the main circuit board 610 of FIG. 6) and the antenna module 660. The first flexible printed circuit board 870 may have, e.g., a second connector 870*a* for coupling and/or connection with the first connector 661*a* of the antenna module 660.

According to an embodiment, one area 870*b* of the first flexible printed circuit board 870 may be coupled to the shielding member 662 of the antenna module 660 of the supporting member 650. The first flexible printed circuit board 870 may be coupled to the shielding member 662 through, e.g., a double-sided tape, but is not limited thereto. For example, the first flexible printed circuit board 870 may have a seating surface 870*c* formed on a surface opposite to the surface coupled to the shielding member 662. A coaxial cable 680 (680-1 and 680-2) may be connected to the seating surface 870*c*. For example, the coaxial cables 680 (680-1 and 680-2) may be connected to the seating surface 770*c* through the sixth connectors 681-1 and 681-2.

According to an embodiment, the coaxial cables 680 (680-1 and 680-2) may be connected to the seating surface 870*c* through the sixth connectors 681-1 and 682. The coaxial cables 680 (680-1 and 680-2) may be electrically connected to the antenna module 660 through the first flexible printed circuit board 870. The coaxial cables 680 (680-1 and 680-2) may be electrically connected to, e.g., a main circuit board (the main circuit board 610 of FIG. 6).

According to an embodiment, the supporting member 650 may include a fixing portion 853. At least a portion of the fixing portion 853 may surround the seating surface 870*c* of the first flexible printed circuit board 870. For example, the fixing portion 853 may support an area of the first flexible printed circuit board 870. In this case, the fixing portion 853 may directly support the first flexible printed circuit board 870 and may indirectly support the shielding member 662 coupled to the first flexible printed circuit board 870.

Figure 15:
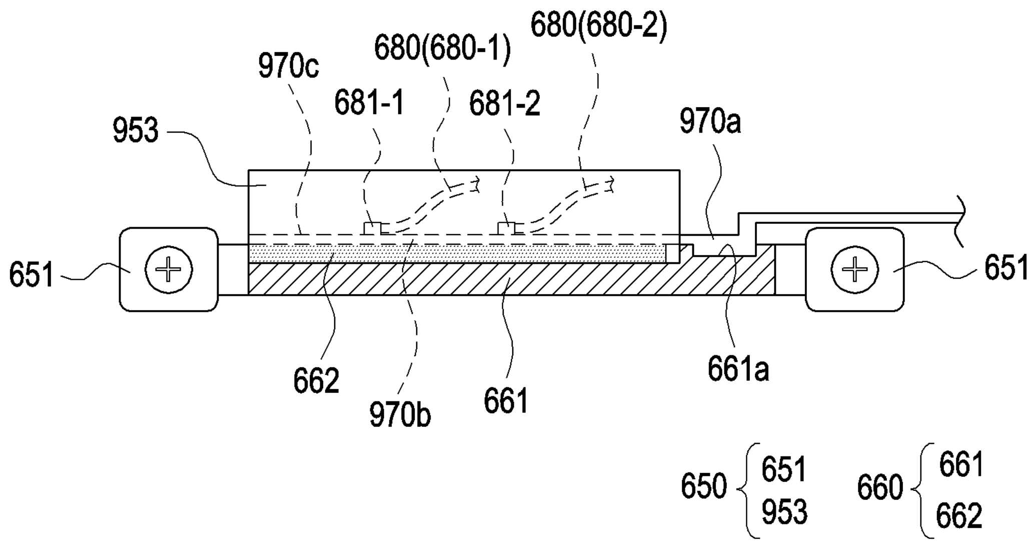
FIG. 15 is a diagram illustrating a plan view of a connection relationship between an antenna module and a flexible printed circuit board according to various embodiments.

FIG. 15 is a diagram illustrating a plan view of a connection relationship between an antenna module and a flexible printed circuit board according to various embodiments.

The configuration of the coupling portion 651, the antenna module 660, and the coaxial cable 680 (680-1 and 680-2) of FIG. 15 may be identical in whole or part to the configuration of the coupling portion 651, the antenna module 660, and the coaxial cable 680 (680-1 and 680-2) of FIGS. 6 to 10.

According to various embodiments, an electronic device (e.g., the electronic device 101 of FIG. 6) may include a first flexible printed circuit board 970.

According to an embodiment, the first flexible printed circuit board 970 may electrically connect the main circuit board (e.g., the main circuit board 610 of FIG. 6) and the antenna module 660. The first flexible printed circuit board 970 may have, e.g., a second connector 970*a* for coupling and/or connection with the first connector 661*a* of the antenna module 660.

According to an embodiment, one area 970*b* of the first flexible printed circuit board 970 may be coupled to the shielding member 662 of the antenna module 660 of the supporting member 650. The first flexible printed circuit board 970 may be coupled to the shielding member 662 through, e.g., a double-sided tape, but is not limited thereto. For example, the first flexible printed circuit board 970 may have a seating surface 970*c* formed on a surface opposite to the surface coupled to the shielding member 662. A coaxial cable 680 (680-1 and 680-2) may be connected to the seating surface 970*c*. For example, the coaxial cables 680 (680-1 and 680-2) may be connected to the seating surface 770*c* through the sixth connectors 681-1 and 681-2.

According to an embodiment, the coaxial cables 680 (680-1 and 680-2) may be connected to the seating surface 870*c* through the sixth connectors 681-1 and 682. The coaxial cables 680 (680-1 and 680-2) may be electrically connected to the antenna module 660 through the first flexible printed circuit board 970. The coaxial cables 680 (680-1 and 680-2) may be electrically connected to, e.g., a main circuit board (the main circuit board 610 of FIG. 6).

According to an embodiment, the supporting member 650 may include a fixing portion 953. At least a portion of the fixing portion 953 may surround the coaxial cables 681 (681-1 and 681-2). For example, the fixing portion 953 may receive the coaxial cables 681-1 and 681-2 in an inner space formed by the fixing portion 953. As another example, the inner space of the fixing portion 953 may be formed to be narrow to press and fix the coaxial cables 681 (681-1 and 681-2).

Figure 16A:
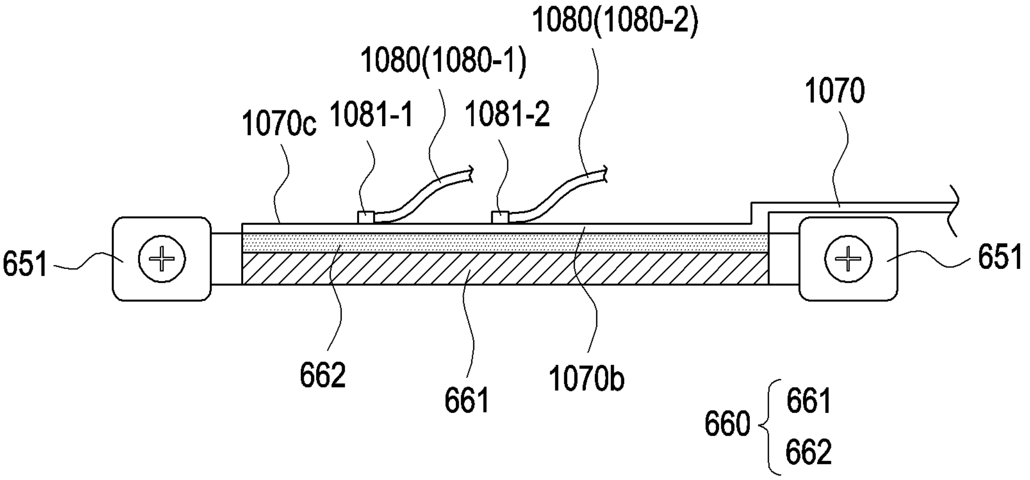
FIG. 16A is a diagram illustrating a plan view of a connection relationship between an antenna module and a flexible printed circuit board according to various embodiments.
Figure 16B:
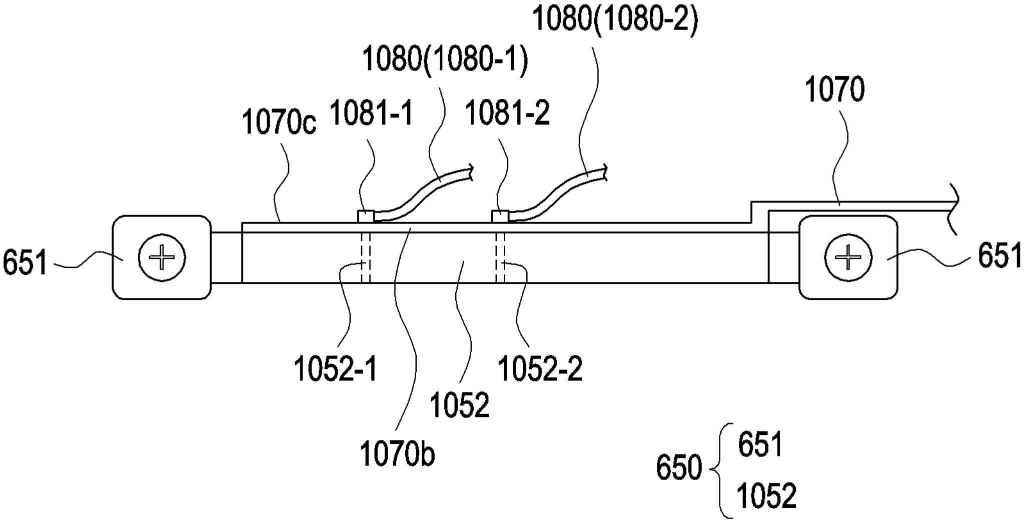
FIG. 16B is a diagram illustrating a plan view of a connection conductive line formed in a supporting member according to various embodiments.

FIG. 16A is a diagram illustrating a plan view of a connection relationship between an antenna module and a flexible printed circuit board according to various embodiments. FIG. 16B is a diagram illustrating a plan view illustrating a connection conductive line formed in a supporting member according to various embodiments. FIG. 16B illustrates a state in which the antenna module 660 is removed in FIG. 16A.

The configuration of the coupling portion 651 and the antenna module 660 of FIGS. 16A and 16B may be identical in whole or part to the configuration of the coupling portion 651 and the antenna module 660 of FIG. 6.

According to various embodiments, an electronic device (e.g., the electronic device 101 of FIG. 6) may include a first flexible printed circuit board 1070.

According to an embodiment, the first flexible printed circuit board 1070 may electrically connect the main circuit board (e.g., the main circuit board 610 of FIG. 6) and the antenna module 660. For example, at least a portion of the first flexible printed circuit board 1070 may be coupled to the supporting member 650. As an example, at least a portion of the first flexible printed circuit board 1070 may be coupled to the bottom portion 1052 of the supporting member 650.

According to an embodiment, connection conductive lines 1052-1 and 1052-2 may be formed on the bottom portion 1052. The connection conductive lines 1052-1 and 1052-2 may include, e.g., a conductive material. As another example, the connection conductive lines 1052-1 and 1052-2 may be formed of conductive vias.

According to an embodiment, the supporting member 650 may be formed of a non-metallic (e.g., polymer or plastic) material, and the connection conductive lines 1052-1 and 1052-2 may be formed on the bottom portion 1052 to electrically connect the first flexible printed circuit board 1070 and the antenna module 660.

According to an embodiment, the supporting member 650 may be provided as, e.g., a substrate (e.g., a PCB, a flexible PCB, or a rigid flexible PCB), and the bottom portion 1052 may be soldered with the antenna module 660. According to an embodiment, the bottom portion 1052 of the supporting member 650 may include connection conductive lines 1052-1 and 1052-2, and the connection conductive lines 1052-1 and 1052-2 may electrically connect the first flexible printed circuit board 1070 and the antenna module 660.

According to an embodiment, at least a portion of the first flexible printed circuit board 1070 may be coupled and/or connected to the bottom portion 1052. For example, the conductive layer of the first flexible printed circuit board 1070 may be connected to and/or in contact with the connection conductive lines 1052-1 and 1052-2. The connection conductive lines 1052-1 and 1052-2 may be connected to, e.g., one end (e.g., a lower end) of the antenna module 660 seated on the bottom portion 1052. For example, at least a portion of one end of the antenna module 660 may be connected and/or in contact with the connection conductive lines 1052-1 and 1052-2 through a conductive layer. Accordingly, the first flexible printed circuit board 1070 may be electrically connected to the antenna module 660.

According to an embodiment, one area 1070*b* of the first flexible printed circuit board 1070 may be coupled to the shielding member 662 of the antenna module 660. For example, the shielding member 662 may include a shield can. The first flexible printed circuit board 970 may be coupled to the shielding member 662 through, e.g., a double-sided tape, but is not limited thereto. For example, the first flexible printed circuit board 1070 may have a seating surface 1070*c* formed on a surface opposite to the surface coupled to the shielding member 662. A coaxial cable 1080 (1080-1 and 1080-2) may be connected to the seating surface 1070*c*. For example, the coaxial cables 1080 (1080-1 and 1080-2) may be connected to the seating surface 1070*c* through the sixth connectors 1081-1 and 1081-2.

According to an embodiment, the coaxial cables 1080 (1080-1 and 1080-2) may be electrically connected to the antenna module 660 through the first flexible printed circuit board 1070 and the connection conductive lines 1052-1 and 1052-2. The coaxial cables 1080 (1080-1 and 1080-2) may be electrically connected to, e.g., a main circuit board (the main circuit board 610 of FIG. 6).

According to an embodiment (not illustrated), the antenna module 660 may include a substrate 661 (e.g., the printed circuit board 310 of FIG. 3) where a plurality of conductive patterns (e.g., the antenna array 330 of FIG. 3) are disposed on a first surface, a stacked member 662 coupled to the substrate 661, and/or a first flexible printed circuit board 1070 spaced apart from the substrate 661 and coupled to the stacked member 662. The first flexible printed circuit board 1070 may include a rigid area 1070*b* and a flexible area. One surface of the rigid area 1070*b* of the first flexible printed circuit board 1070 may be coupled to the stacked member 662, and the coaxial cables 1080-1 and 1080-2 may be connected to the other surface of the rigid area 1070*b*. The flexible area of the first flexible printed circuit board 1070 may be electrically connected to a main circuit board (e.g., the main circuit board 610 of FIG. 6) or a sub circuit board (e.g., the sub circuit board 630 of FIG. 6). An RFIC (e.g., the RFIC 352 of FIG. 3) and/or a PMIC (e.g., the PMIC 354 of FIG. 3) may be disposed on at least one surface of the first flexible printed circuit board 1070 and/or the substrate 661. The stacked member 662 may be formed of, e.g., a substrate member (e.g., FR-4, rogers, polyimide). The stacked member 662 may form a space in which the RFIC and the PMIC may be embedded and/or disposed. The stacked member 662 may play substantially the same role as the shielding member. As an example, the substrate 661, the stacked member 662, and the first flexible printed circuit board 1070 may be formed of an interposer printed circuit board (or a stacked printed circuit board). The stacked member 662 may include a connection conductive line (not illustrated) that electrically connects the first flexible printed circuit board 1070 and the substrate 661 of the antenna module 660. According to an embodiment (not illustrated), the antenna module 660 may include the substrate 661 and the first flexible printed circuit board 1070. The first flexible printed circuit board 1070 may be directly coupled to the substrate 661. The substrate 661 may form at least a portion of the first surface facing outward of the electronic device 101. For example, the first surface may be formed as a front surface of the substrate 661. The substrate 661 and/or the first flexible printed circuit board 1070 may form at least a portion of the second surface facing in a direction different from the direction of the first surface. For example, the second surface may be formed as a combination of the substrate 661 and the first flexible printed circuit board 1070. As an example, at least a portion (e.g., an area coupled to the substrate 661) of the first flexible printed circuit board 1070 may be provided as an interposer printed circuit board (or a stacked printed circuit board), and the interposer printed circuit board may include a PMIC (e.g., the PMIC 352 of FIG. 3) and an RFIC (e.g., the RFIC 354 of FIG. 3). As the first flexible printed circuit board 1070 is directly connected to the substrate 661, the coaxial cables 680 (680-1 and 680-2) may be electrically connected to the substrate 661 of the antenna module 660.

Figure 17:
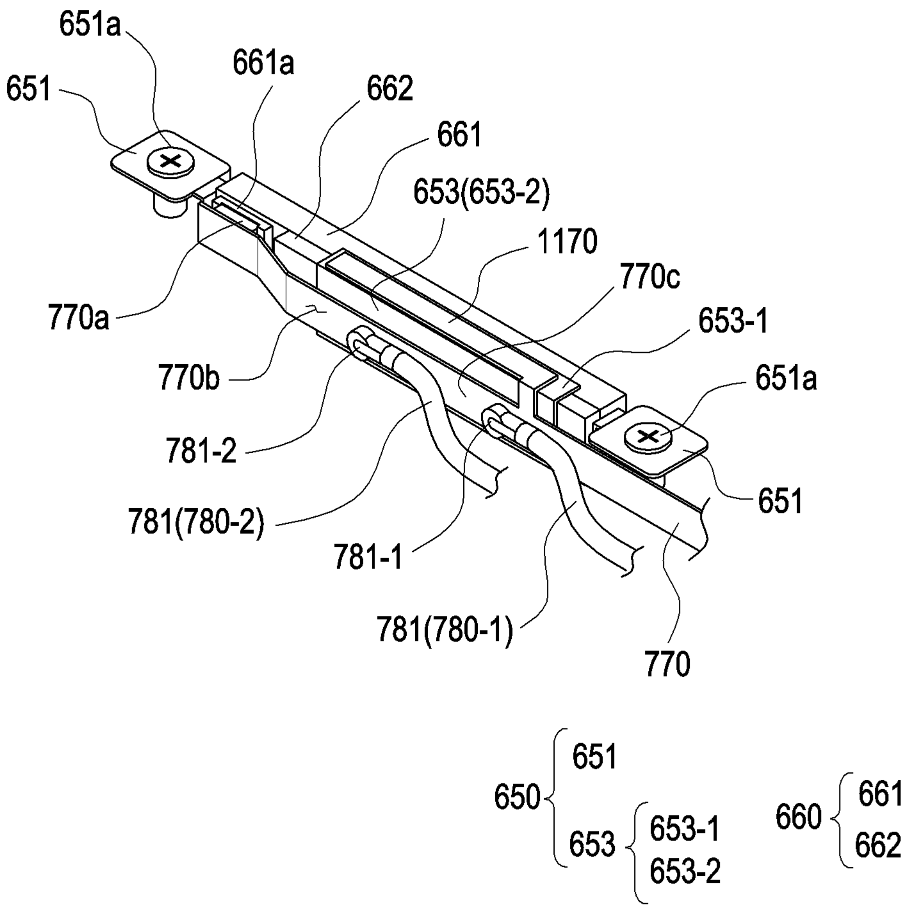
FIG. 17 is a perspective view illustrating an antenna module and a flexible printed circuit board according to various embodiments.

FIG. 17 is a perspective view illustrating an antenna module and a flexible printed circuit board according to various embodiments.

The configuration of the supporting member 650 and the antenna module 660 of FIG. 17 may be identical in whole or part to the configuration of the supporting member 650 and the antenna module 660 of FIG. 6.

The configuration of the first flexible printed circuit board 770 and the coaxial cable 780 (780-1 and 780-2) of FIG. 17 may be identical in whole or part to the configuration of the first flexible printed circuit board 770 and the coaxial cable 780 (780-1 and 780-2) of FIG. 11.

Referring to FIG. 17, an electronic device (e.g., the electronic device 101 of FIG. 6) may include a pattern antenna 1170.

According to an embodiment, the pattern antenna 1170 may extend from the first flexible printed circuit board 770 and may be seated on the supporting member 650. For example, the pattern antenna 1170 may be seated on the surface of the first fixing portion 653-1 of the supporting member 650. As another example, the pattern antenna 1170 may be seated on the surface of the second fixing portion 653-2 of the supporting member 650, the surface of the third fixing portion (e.g., the third fixing portion 653-3 of FIG. 9), and/or the surface of the bottom portion (e.g., the bottom portion 652 of FIG. 9).

According to an embodiment, the pattern antenna 1170 may be formed of a strip-shaped copper foil having one end connected to the first flexible printed circuit board 770 and extending along the surface of the first fixing portion 653-1. However, the present disclosure is not limited thereto.

According to an embodiment, the pattern antenna 1170 may function as an NFC antenna and/or an MST antenna for short-range wireless communication. According to an embodiment, the pattern antenna 1170 may function as an antenna for a first cellular network (e.g., a legacy network) (e.g., the first cellular network 199 of FIG. 2) such as 4G.

Figure 18:
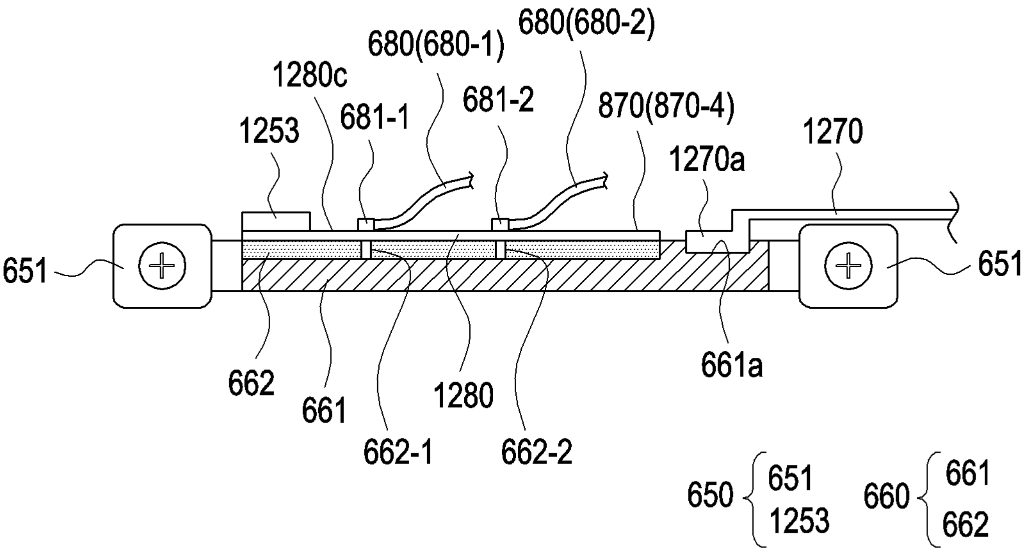
FIG. 18 is a diagram illustrating a plan view of a connection relationship between an antenna module and a flexible printed circuit board according to various embodiments.

FIG. 18 is a diagram illustrating a plan view of a connection relationship between an antenna module and a flexible printed circuit board according to various embodiments.

The configuration of the coupling portion 651, the antenna module 660, and the coaxial cable 680 (680-1 and 680-2) of FIG. 18 may be identical in whole or part to the configuration of the coupling portion 651, the antenna module 660, and the coaxial cable 680 (680-1 and 680-2) of FIGS. 6 to 10.

According to various embodiments, an electronic device (e.g., the electronic device 101 of FIG. 6) may include a first flexible printed circuit board 1270 and/or a second substrate 1280.

According to an embodiment, the first flexible printed circuit board 1270 may electrically connect the main circuit board (e.g., the main circuit board 610 of FIG. 6) and the antenna module 660. The first flexible printed circuit board 1270 may be electrically connected to, e.g., the antenna module 660. The first flexible printed circuit board 1270 may have, e.g., a second connector 1270*a* for coupling and/or connection with the first connector 661*a* of the antenna module 660.

According to an embodiment, the second substrate 1280 may be spaced apart from the first flexible printed circuit board 1270. As an example, the second substrate 1280 may include any one of a printed circuit board (PCB), a flexible printed circuit board (flexible PCB), and a rigid-flexible PCB (RFPCB). One area of the second substrate 1280 may be coupled to the shielding member 662. The second substrate 1280 may be coupled to the shielding member 662 through, e.g., a double-sided tape, but is not limited thereto. The second substrate 1280 may have a seating surface 1280*c* formed on a surface opposite to the surface coupled to the shielding member 662. For example, the coaxial cables 680 (680-1 and 680-2) may be connected to the seating surface 1280*c* through the sixth connectors 681-1 and 681-2. The coaxial cables 680 (680-1 and 680-2) may be electrically connected to the antenna module 660 through the second substrate 1280. The coaxial cables 680 (680-1 and 680-2) may be electrically connected to, e.g., a main circuit board (the main circuit board 610 of FIG. 6).

According to an embodiment, the shielding member 662 may include connection conductive lines 662-1 and 662-2. The connection conductive lines 662-1 and 662-2 may include, e.g., a conductive material. As another example, the connection conductive lines 662-1 and 662-2 may be formed of conductive vias.

According to an embodiment, at least a portion of the second substrate 1280 may be coupled to the shielding member 662. For example, the conductive layer of the second substrate 1280 may be connected to and/or in contact with the connection conductive lines 662-1 and 662-2. For example, the substrate 661 may be connected and/or in contact with the connection conductive lines 662-1 and 662-2 through the conductive layer of the substrate 661. Accordingly, the second substrate 1280 may be electrically connected to the substrate 661 of the antenna module 660.

According to an embodiment, the supporting member 650 may include a fixing portion 1253. At least a portion of the fixing portion 1253 may surround the seating surface 1280*c* of the second substrate 1280. For example, the fixing portion 1253 may support an area of the second substrate 1280. In this case, the fixing portion 1253 may directly support the second substrate 1280 and may indirectly support the shielding member 662 coupled to the second substrate 1280.

According to an embodiment (not illustrated), a connection conductive line (not illustrated) may be formed on the bottom portion (not illustrated) (e.g., the third fixing portion 653-3 and/or the bottom portion 652 of FIG. 9C) of the supporting member 650. The connection conductive line may include, e.g., a conductive material. As another example, the connection conductive line may be formed of a conductive via. As an example, at least a portion of the second substrate 1280 may be coupled and/or connected to the bottom portion (not illustrated). For example, the conductive layer of the second substrate 1280 may be connected to and/or in contact with the connection conductive line. For example, the connection conductive line may be connected to one end (e.g., a lower end) of the antenna module 660 seated on the bottom portion (not illustrated). For example, at least a portion of one end of the antenna module 660 may be connected and/or in contact with the connection conductive line through a conductive layer. Accordingly, the second substrate 1280 may be electrically connected to the antenna module 660. According to an embodiment, the supporting member 650 may be formed of a non-metallic (e.g., polymer or plastic) material, and a connection conductive line may be formed on the bottom portion of the supporting member 650 so that the connection conductive line may electrically connect the second substrate 1280 and the antenna module 660. According to an embodiment, the supporting member 650 may be provided as a substrate (e.g., a printed circuit board, a flexible PCB, or a rigid flexible PCB), and the bottom portion of the supporting member 650 may be soldered to the antenna module 660 so that the connection conductive lines 1052-1 and 1052-2 provided on the bottom portion may electrically connect the second substrate 1280 and the antenna module 660.

According to an embodiment (not illustrated), the antenna module 660 may include a substrate 661, a first flexible printed circuit board 1270, and a second substrate 1280. The second substrate 1280 may be directly coupled to the substrate 661. The substrate 661 may form at least a portion of the first surface facing outward of the electronic device 101. For example, the first surface may be formed as a front surface of the substrate 661. The substrate 661 and/or the second substrate 1280 may form at least a portion of the second surface facing in a direction different from the direction of the first surface. For example, the second surface may be formed as a combination of the substrate 661 and the second substrate 1280. As an example, at least a portion (e.g., an area coupled to the substrate 661) of the second substrate 1280 may be provided as an interposer printed circuit board (or a stacked printed circuit board), and the interposer printed circuit board may include a PMIC (e.g., the PMIC 352 of FIG. 3) and an RFIC (e.g., the RFIC 354 of FIG. 3). As the second substrate 1280 is directly connected to the substrate 661, the coaxial cables 680 (680-2 and 680-2) may be electrically connected to the substrate 661 of the antenna module 660.

According to an embodiment, the antenna module 660 may include a substrate 661 (e.g., the printed circuit board 310 of FIG. 3) on which a plurality of conductive patterns (e.g., the antenna array 330 of FIG. 3) are disposed on the first surface and a stacked member 662 coupled to the substrate 661. According to an embodiment, the second substrate 1280 may be coupled to one surface of the stacked member 662. An RFIC (e.g., the RFIC 352 of FIG. 3) and/or a PMIC (e.g., the PMIC 354 of FIG. 3) may be disposed on at least one surface of the substrate 661 and/or the second substrate 1280. The stacked member 662 may be formed of, e.g., a substrate member (e.g., FR-4, rogers, polyimide). The stacked member 662 may form a space in which the RFIC and the PMIC may be embedded and/or disposed. The stacked member 662 may play substantially the same role as the shielding member.

According to various example embodiments of the disclosure, an electronic device (e.g., the electronic device 101 of FIGS. 1, 2, 3, 5, and 6) may comprise: a housing (e.g., the housing 400 of FIG. 4, the housing 500 of FIG. 5, and the housing 600 of FIG. 6), a main circuit board (e.g., the first printed circuit board 550 of FIG. 5 and the main circuit board 610 of FIG. 6) disposed in the housing, an antenna module, comprising at least one antenna (e.g., the third antenna module 246 of FIG. 2, the antenna module 510 of FIG. 5, and the antenna module 660 of FIG. 6), disposed in the housing and including a first surface facing outward of the electronic device and a second surface facing in a direction different from the first surface, wherein a plurality of conductive patterns (e.g., the antenna array 330 of FIG. 3 or the antenna array 511 of FIG. 5) are disposed on the first surface, a flexible printed circuit board (e.g., the first flexible printed circuit board 570 of FIG. 5, the first flexible printed circuit board 670 of FIG. 6, the first flexible printed circuit board 770 of FIG. 11, the first flexible printed circuit board 870 of FIG. 14, and the first flexible printed circuit board 1070 of FIG. 16) with at least a portion disposed on the second surface and electrically connecting the main circuit board and the antenna module, and a cable (e.g., the coaxial cable 580 of FIG. 5, the coaxial cable 680 of FIG. 6, the coaxial cable 780 of FIG. 11, and the coaxial cable 1080 of FIG. 16) connected to a seating surface (e.g., the seating surface 670*c* of FIG. 6, the seating surface 770*c* of FIG. 11, the seating surface 870*c* of FIG. 14, and the seating surface 1070*c* of FIG. 16) formed by the flexible printed circuit board to be electrically connected to the antenna module.

According to various example embodiments, the cable includes a coaxial cable (e.g., the coaxial cable 580 of FIG. 5, the coaxial cable 680 of FIG. 6, the coaxial cable 780 of FIG. 11, and the coaxial cable 1080 of FIG. 16).

According to various example embodiments, the electronic device further comprises a supporting member comprising a support (e.g., the supporting member 650 of FIG. 6) coupled to the housing and with at least a portion supporting the antenna module.

According to various example embodiments, the supporting member may include a fixing portion (e.g., the fixing portion 653 of FIG. 6) having at least a portion surrounding the second surface of the antenna module. The flexible printed circuit board may have at least a portion coupled to the fixing portion. The seating surface may include a surface of the flexible printed circuit board opposite to a surface coupled to the fixing portion.

According to various example embodiments, the supporting member may include a fixing portion (e.g., the fixing portion 853 of FIG. 14) having at least a portion surrounding the seating surface (e.g., the seating surface 870*c* of FIG. 14) of the flexible printed circuit board.

According to various example embodiments, the supporting member may include a fixing portion (e.g., the fixing portion 953 of FIG. 15) having at least a portion surrounding the cable.

According to various example embodiments, the flexible printed circuit board may include a pattern antenna (e.g., the pattern antenna 1170 of FIG. 17) extending from the flexible printed circuit board and seated on the supporting member.

According to various example embodiments, the supporting member may include a bottom portion (e.g., the bottom portion 652 of FIG. 9) supporting at least a portion of a lower end of the antenna module, a first fixing portion (e.g., the first fixing portion 653-1 of FIG. 9) supporting at least a portion of an upper end of the antenna module, and a second fixing portion (e.g., the second fixing portion 653-2 of FIG. 9) supporting at least a portion of the second surface of the antenna module.

According to various example embodiments, the supporting member may include a coupling portion (e.g., the coupling portion 651 of FIG. 6) fastened to the housing.

According to various example embodiments, the flexible printed circuit board (e.g., the first flexible printed circuit board 1070 of FIGS. 16A and 16B) may have at least a portion coupled to the supporting member (e.g., the supporting member 660 of FIGS. 16A and 16B). The supporting member may include a connection conductive line (e.g., the connection conductive lines 1052-1 and 1052-2 of FIG. 16B) electrically connecting the flexible printed circuit board and the antenna module.

According to various example embodiments, the antenna module may include a first connector (e.g., the first connector 661*a* of FIG. 6) provided on at least a portion of the second surface. The flexible printed circuit board may include a second connector (e.g., the second connector 670*a* of FIG. 6, the second connector 770*a* of FIG. 11, the second connector 870*a* of FIG. 14, the second connector 970*a* of FIG. 15, and the second connector 1070*a* of FIG. 16) connected to the first connector.

According to various example embodiments, the flexible printed circuit board may include a mounting portion (e.g., the mounting portions 770*d*-1 and 770*d*-2 of FIG. 13) having at least a portion on which the cable is mounted.

According to various example embodiments of the disclosure, an electronic device (e.g., the electronic device 101 of FIGS. 1, 2, 3, 5, and 6) may comprise: a housing (e.g., the housing 400 of FIG. 4, the housing 500 of FIG. 5, and the housing 600 of FIG. 6), a main circuit board (e.g., the first printed circuit board 550 of FIG. 5 and the main circuit board 610 of FIG. 6) disposed in the housing, an antenna module, comprising an antenna (e.g., the third antenna module 246 of FIG. 2, the antenna module 510 of FIG. 5, and the antenna module 660 of FIG. 6), disposed in the housing and including a first surface facing outward of the electronic device and a second surface facing in a direction different from the first surface, wherein a plurality of conductive patterns (e.g., the antenna array 330 of FIG. 3 or the antenna array 511 of FIG. 5) are disposed on the first surface, a supporting member, comprising a support (e.g., the supporting member 650 of FIG. 6), supporting the antenna module, a flexible printed circuit board (e.g., the first flexible printed circuit board 570 of FIG. 5, the first flexible printed circuit board 670 of FIG. 6, the first flexible printed circuit board 770 of FIG. 11, the first flexible printed circuit board 870 of FIG. 14, and the first flexible printed circuit board 1070 of FIG. 16) having at least a portion disposed on the supporting member and electrically connecting the main circuit board and the antenna module, and a cable (e.g., the coaxial cable 580 of FIG. 5, the coaxial cable 680 of FIG. 6, the coaxial cable 780 of FIG. 11, and the coaxial cable 1080 of FIG. 16) connected to a seating surface (e.g., the seating surface 670*c* of FIG. 6, the seating surface 770*c* of FIG. 11, the seating surface 870*c* of FIG. 14, and the seating surface 1070*c* of FIG. 16) formed by the flexible printed circuit board to be electrically connected to the antenna module.

According to various example embodiments, the seating surface (e.g., the coaxial cable 580 of FIG. 5, the coaxial cable 680 of FIG. 6, the coaxial cable 780 of FIG. 11, and the coaxial cable 1080 of FIG. 16) may include a surface of the flexible printed circuit board opposite to a surface disposed on the supporting member.

According to various example embodiments, the supporting member may include a fixing portion (e.g., the fixing portion 653 of FIG. 6) having at least a portion surrounding the second surface of the antenna module. The flexible printed circuit board may have at least a portion coupled to the fixing portion. The seating surface may include a surface of the flexible printed circuit board opposite to a surface coupled to the fixing portion.

The supporting member may include a fixing portion (e.g., the fixing portion 853 of FIG. 14) having at least a portion surrounding the seating surface (e.g., the seating surface 870*c* of FIG. 14) of the flexible printed circuit board.

The supporting member may include a fixing portion (e.g., the fixing portion 953 of FIG. 15) having at least a portion surrounding the cable.

According to various example embodiments of the disclosure, an electronic device (e.g., the electronic device 101 of FIGS. 1, 2, 3, 5, and 6) may comprise: a housing (e.g., the housing 400 of FIG. 4, the housing 500 of FIG. 5, and the housing 600 of FIG. 6), a main circuit board (e.g., the first printed circuit board 550 of FIG. 5 and the main circuit board 610 of FIG. 6) disposed in the housing, an antenna module, comprising an antenna (e.g., the third antenna module 246 of FIG. 2, the antenna module 510 of FIG. 5, and the antenna module 660 of FIG. 6), disposed in the housing and including a first surface including a plurality of conductive patterns and a second surface having a first area (e.g., the first connector 661*a* of FIG. 6) configured to electrically connect to the main circuit board, a supporting member, comprising a support (e.g., the supporting member 650 of FIG. 6), fixing the antenna module to the housing, a flexible printed circuit board (e.g., the first flexible printed circuit board 570 of FIG. 5, the first flexible printed circuit board 670 of FIG. 6, the first flexible printed circuit board 770 of FIG. 11, the first flexible printed circuit board 870 of FIG. 14, and the first flexible printed circuit board 1070 of FIG. 16) having at least a portion disposed on the supporting member or the second surface and electrically connecting the main circuit board and the antenna module, and a cable (e.g., the coaxial cable 580 of FIG. 5, the coaxial cable 680 of FIG. 6, the coaxial cable 780 of FIG. 11, and the coaxial cable 1080 of FIG. 16) connected to a surface opposite to a surface where the flexible printed circuit board is disposed on the supporting member or the second surface to electrically connect to the antenna module.

According to various example embodiments, the housing may include a front surface facing in a first direction, a rear surface (e.g., the second surface 600*b* of FIG. 6) facing in a second direction opposite to the first direction, and a side surface (e.g., the third surface 600*c* of FIG. 6) connecting the front surface and the rear surface. The antenna module may be disposed adjacent to the side surface. The first surface of the antenna module may face the side surface of the housing.

According to various example embodiments, the flexible printed circuit board may include a second area (e.g., the second connector 670*a* of FIG. 6, the second connector 770*a* of FIG. 11, the second connector 870*a* of FIG. 14, the second connector 970*a* of FIG. 15, and the second connector 1070*a* of FIG. 16) electrically connected to the first area.

While the disclosure has been illustrated and described with reference to various example embodiments thereof, it will be understood that the various example embodiments are intended to be illustrative, not limiting. It will be further understood by those of ordinary skill in the art that various changes in form and detail may be made without departing from the true spirit and full scope of the disclosure including the appended claims, and their equivalents. It will also be understood that any of the embodiment(s) described herein may be used in conjunction with any other embodiment(s) described herein.

What is claimed is:

1. An electronic device, comprising:

a housing;

a main circuit board disposed in the housing;

an antenna module, comprising an antenna, disposed in the housing and including a first surface facing outward of the electronic device and a second surface facing in a direction different from the first surface, wherein a plurality of conductive patterns are disposed on the first surface;

a flexible printed circuit board having at least a portion disposed on the second surface and electrically connecting the main circuit board and the antenna module; and a cable connected to a seating surface formed by the flexible printed circuit board to be electrically connected to the antenna module.

2. The electronic device of claim 1, wherein the cable comprises a coaxial cable.

3. The electronic device of claim 1, further comprising a supporting member, comprising a support, coupled to the housing and having at least a portion supporting the antenna module.

4. The electronic device of claim 3, wherein the supporting member includes a fixing portion having at least a portion surrounding the second surface of the antenna module, wherein the flexible printed circuit board has at least a portion coupled to the fixing portion, and wherein the seating surface includes a surface of the flexible printed circuit board opposite to a surface coupled to the fixing portion.

5. The electronic device of claim 3, wherein the supporting member includes a fixing portion having at least a portion surrounding the seating surface of the flexible printed circuit board.

6. The electronic device of claim 3, wherein the supporting member includes a fixing portion having at least a portion surrounding the cable.

7. The electronic device of claim 3, wherein the flexible printed circuit board includes a pattern antenna extending from the flexible printed circuit board and seated on the supporting member.

8. The electronic device of claim 3, wherein the supporting member includes a bottom portion supporting at least a portion of a lower end of the antenna module, a first fixing portion supporting at least a portion of an upper end of the antenna module, and a second fixing portion supporting at least a portion of the second surface of the antenna module.

9. The electronic device of claim 3, wherein the supporting member includes a coupling portion fastened to the housing.

10. The electronic device of claim 3, wherein the flexible printed circuit board has at least a portion coupled to the supporting member, and wherein the supporting member includes a connection conductive line electrically connecting the flexible printed circuit board and the antenna module.

11. The electronic device of claim 1, wherein the antenna module includes a first connector provided on at least a portion of the second surface, and wherein the flexible printed circuit board includes a second connector connected to the first connector.

12. The electronic device of claim 1, wherein the flexible printed circuit board includes a mounting portion having at least a portion on which the cable is mounted.

13. An electronic device, comprising:

a housing;

a main circuit board disposed in the housing;

an antenna module, comprising an antenna, disposed in the housing and including a first surface facing outward of the electronic device and a second surface facing in a direction different from the first surface, wherein a plurality of conductive patterns are disposed on the first surface;

a supporting member, comprising a support, supporting the antenna module;

a flexible printed circuit board having at least a portion disposed on the supporting member and electrically connecting the antenna module and the main circuit board; and a cable connected to a seating surface formed by the flexible printed circuit board to be electrically connected to the antenna module.

14. The electronic device of claim 13, wherein the seating surface includes a surface of the flexible printed circuit board opposite to a surface disposed on the supporting member.

15. The electronic device of claim 13, wherein the supporting member includes a fixing portion having at least a portion surrounding the second surface of the antenna module, wherein the flexible printed circuit board has at least a portion coupled to the fixing portion, and wherein the seating surface includes a surface of the flexible printed circuit board opposite to a surface coupled to the fixing portion.

16. The electronic device of claim 13, wherein the support member includes a fixing portion has at least a portion surrounding a seating surface of the flexible printed circuit board.

17. The electronic device of claim 13, wherein the support member includes a fixing portion has at least a portion surrounding the cable.

18. An electronic device, comprising:

a housing;

a main circuit board disposed in the housing;

an antenna module, comprising an antenna, disposed in the housing and including a first surface including a plurality of conductive patterns and a second surface having a first area configured to electrically connect to the main circuit board;

a supporting member, comprising a support, fixing the antenna module to the housing;

a flexible printed circuit board having at least a portion disposed on the supporting member or the second surface and electrically connecting the main circuit board and the antenna module; and a cable connected to a surface opposite to a surface where the flexible printed circuit board is disposed on the supporting member or the second surface to electrically connect to the antenna module.

19. The electronic device of claim 18, wherein the housing includes a front surface facing in a first direction, a rear surface facing in a second direction opposite to the first direction, and a side surface connecting the front surface and the rear surface, wherein the antenna module is disposed adjacent to the side surface, and wherein the first surface of the antenna module faces the side surface of the housing.

20. The electronic device of claim 18, wherein the flexible printed circuit board includes a second area electrically connected to the first area.

* * * * *